United States Patent
Yunoki et al.

(10) Patent No.: US 10,466,697 B2
(45) Date of Patent: Nov. 5, 2019

(54) MONITORING CONTROL SYSTEM, MONITORING CONTROL DEVICE, AND MONITORING CONTROL METHOD

(71) Applicant: HITACHI, LTD., Tokyo (JP)

(72) Inventors: Shoji Yunoki, Tokyo (JP); Hideki Endo, Tokyo (JP); Hiroyuki Kubo, Tokyo (JP)

(73) Assignee: Hitachi, Ltd., Tokyo (JP)

(*) Notice: Subject to any disclaimer, the term of this patent is extended or adjusted under 35 U.S.C. 154(b) by 34 days.

(21) Appl. No.: 15/928,715

(22) Filed: Mar. 22, 2018

(65) Prior Publication Data

US 2018/0364705 A1 Dec. 20, 2018

(30) Foreign Application Priority Data

Jun. 15, 2017 (JP) .................. 2017-117581

(51) Int. Cl.
*G05D 1/00* (2006.01)
*H04N 17/00* (2006.01)
*H04L 12/26* (2006.01)
*H04N 7/18* (2006.01)
*G05D 1/02* (2006.01)

(52) U.S. Cl.
CPC ......... *G05D 1/0055* (2013.01); *G05D 1/0022* (2013.01); *G05D 1/0088* (2013.01); *G05D 1/0231* (2013.01); *H04N 7/18* (2013.01); *H04N 7/183* (2013.01); *H04N 17/00* (2013.01); *G05D 1/0257* (2013.01); *G05D 1/0278* (2013.01); *G05D 2201/0213* (2013.01); *H04L 43/0829* (2013.01)

(58) Field of Classification Search
CPC .. G05D 1/0055; G05D 1/0231; G05D 1/0088; G05D 1/0022; G05D 2201/0213; G05D 1/0257; G05D 1/0278; H04N 7/183; H04N 17/00; H04N 7/18; H04L 43/0829
See application file for complete search history.

(56) References Cited

U.S. PATENT DOCUMENTS

2014/0207535 A1* 7/2014 Stefan .................. G05D 1/0022
                                                              705/7.42
2015/0324636 A1* 11/2015 Bentley .................. G11B 27/17
                                                                386/227

FOREIGN PATENT DOCUMENTS

| JP | 2008-090576 A | 4/2008 |
| JP | 2014-071777 A | 4/2014 |

* cited by examiner

*Primary Examiner* — Anne M Antonucci
(74) *Attorney, Agent, or Firm* — Volpe and Koenig, P.C.

(57) ABSTRACT

A monitoring control system includes a mobile object and a server device that communicates with the mobile object. The mobile object includes: a first communication unit; a camera; an encoding unit that generates image data from the image captured by the camera; a transmitting unit that transmits the image data; and a movement control unit that controls movement of the mobile object according to a control signal received from the server device via the first communication unit, and the server device includes: a second communication unit that communicates with the mobile object; and an emergency control signal transmitting unit that transmits an emergency control signal to the mobile object via the second communication unit when at least a part of a key frame among the image data transmitted from the mobile object is not received within a predetermined period.

15 Claims, 31 Drawing Sheets

EMERGENCY CONTROL EXECUTION DETERMINING UNIT

KEY FRAME LOSS RATE-BASE EMERGENCY CONTROL TABLE

| KEY FRAME LOSS RATE | EMERGENCY CONTROL METHOD |
|---|---|
| 0 | NONE |
| 0~0.5 | SPEED LIMITER CONTROL (RESTRICT TRAVEL SPEED TO 5 km/h OR LOWER) |
| 0.5~1.0 | EMERGENCY STOP |

EMERGENCY CONTROL EXECUTION DETERMINING UNIT

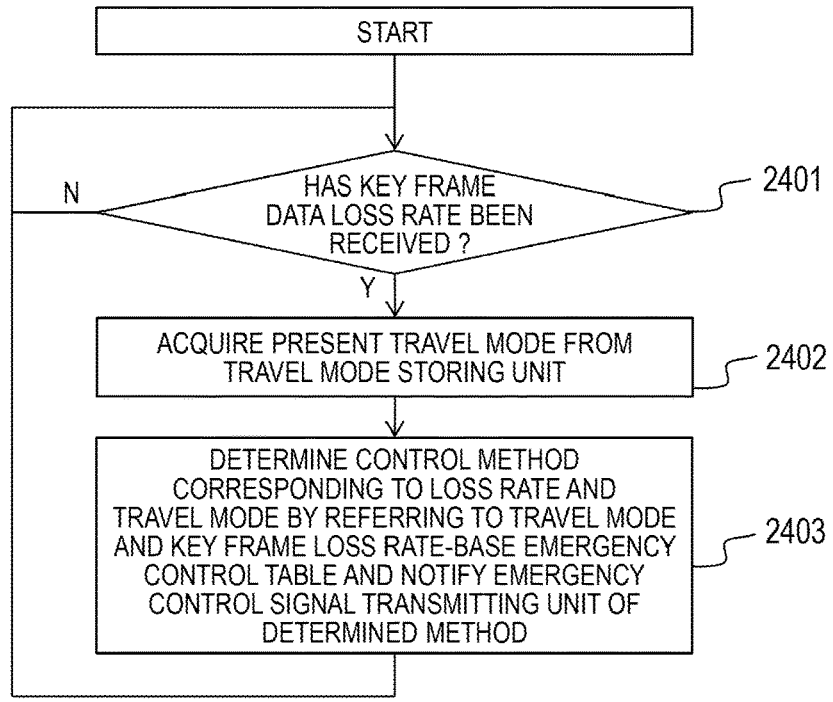

Fig.24

TRAVEL MODE AND KEY FRAME LOSS RATE-BASE EMERGENCY CONTROL TABLE

| TRAVEL MODE | KEY FRAME LOSS RATE | EMERGENCY CONTROL METHOD |
|---|---|---|
| AUTOMATED DRIVING | 0 | NONE |
| | 0~0.5 | SPEED LIMITER CONTROL (RESTRICT TRAVEL SPEED TO 10 km/h OR LOWER) |
| | 0.5~1.0 | SPEED LIMITER CONTROL (RESTRICT TRAVEL SPEED TO 5 km/h OR LOWER) |
| REMOTE-CONTROLLED DRIVING | 0 | NONE |
| | 0~0.5 | SPEED LIMITER CONTROL (RESTRICT TRAVEL SPEED TO 5 km/h OR LOWER) |
| | 0.5~1.0 | EMERGENCY STOP |

Fig.25

TRAVEL MODE-BASE EMERGENCY CONTROL TABLE

| TRAVEL MODE | EMERGENCY CONTROL |
|---|---|
| AUTOMATED DRIVING | SPEED LIMITER CONTROL (RESTRICT TRAVEL SPEED TO 5 km/h OR LOWER) |
| REMOTE-CONTROLLED DRIVING | EMERGENCY STOP |

*Fig.35*

MONITORING CONTROL SYSTEM, MONITORING CONTROL DEVICE, AND MONITORING CONTROL METHOD

CLAIM OF PRIORITY

The present application claims priority from Japanese patent application JP2017-117581 filed on Jun. 15, 2017, the content of which is hereby incorporated by reference into this application.

BACKGROUND OF THE INVENTION

The present invention relates to a remote monitoring control technique for autonomous mobile objects.

In recent years, automated driving techniques have been developed to provide inexpensive and safe moving means. In order to realize completely automated driverless driving, it is necessary to cope with imperfection in recognition, determination, and control. In order to put imperfect autonomous vehicles into practical use (launching) at an early stage, a method of guaranteeing safety by monitoring and controlling automated driving vehicles from a remote center has been considered. For example, a use case in which, in order to determine whether determination and control of automated driving is appropriate in a place where it is difficult to make determination for automated driving such as near intersections, an autonomous vehicle transmits surrounding images acquired by the autonomous vehicle to a remote center, and a monitoring controlling person who performs monitoring in the remote center performs emergency stop control when the autonomous vehicle makes inappropriate determination can be considered. Another use case in which, when automated driving cannot be continued and automated driving is disabled in a situation different from a normal situation (for example, when a road construction is being performed), an autonomous vehicle transmits surrounding images acquired by the autonomous vehicle to a remote center, and a monitoring controlling person in the remote center performs remote-controlled driving can be considered. When such remote monitoring and remote-controlled driving is performed, an autonomous vehicle and a monitoring control center may communicate using a wireless network such as a cellular phone network. It is necessary to secure travelling safety even when communication quality varies due to fluctuation of a propagation state of a wireless network.

Japanese Patent Application Publication No. 2014-071777 discloses an example of a method of transmitting images to a remote center when remote-controlled driving is performed. Japanese Patent Application Publication No. 2008-090576 discloses an example of a method of improving stability of movement of an autonomous mobile object.

SUMMARY OF INVENTION

Japanese Patent Application Publication No. 2014-071777 discloses a technique of performing MPEG (Moving Picture Experts Group) compression on surrounding images using a key frame and a difference frame and transmitting the compressed images to a remote center in order to reduce the amount of surrounding image data transmitted by vehicles in a system that controls (operates) vehicles from the remote center.

Japanese Patent Application Publication No. 2008-090576 discloses a system that controls a moving speed according to communication quality on a moving route of an autonomous mobile object. According to a combination of the techniques disclosed in Japanese Patent Application Publication Nos. 2014-071777 and 2008-090576, in a system in which a vehicle transmits a video made up of a key frame and a difference frame to a remote center, and the remote center executes control, it is possible to secure safety since the moving speed is restricted frequently when the communication quality deteriorates. However, it is not possible to shorten the moving time.

In order to solve the problem, according to a representative example of the present invention, a monitoring control system includes a mobile object and a server device that communicates with the mobile object via a network, wherein the mobile object includes: a first communication unit that communicates with the server device via the network; a camera that captures an image; an encoding unit that generates image data from the image captured by the camera, the image data including a key frame inserted at a predetermined interval and a difference frame including a difference from the key frame; a transmitting unit that transmits the image data generated by the encoding unit to the server device via the first communication unit; and a movement control unit that controls movement of the mobile object according to a control signal received from the server device via the first communication unit, and the server device includes: a second communication unit that communicates with the mobile object via the network; and an emergency control signal transmitting unit that transmits an emergency control signal to the mobile object via the second communication unit when at least a part of the key frame among the image data transmitted from the mobile object is not received within a predetermined period.

According to an aspect of the present invention, in a system in which a mobile object such as a vehicle moving by autonomous driving and a remote center are connected by a communication network to perform remote monitoring and control, it is possible to shorten the moving time while securing the safety of the mobile object. Other objects, structures, and advantages other than those described above will be apparent from the following description of embodiments.

BRIEF DESCRIPTION OF DRAWINGS

FIG. 24 is a flowchart illustrating the process of an emergency control execution determining unit according to Embodiment 4 of the present invention.

FIG. 25 is an explanatory diagram illustrating an example of a key frame loss rate-base emergency control table according to Embodiment 4 of the present invention.

FIG. 35 is an explanatory diagram illustrating an example of a travel mode-base emergency control table according to Embodiment 6 of the present invention.

DETAILED DESCRIPTION OF EMBODIMENTS

Embodiments of the present invention will be described with reference to the drawings. In the embodiments of the present invention, although an automobile is described as an example of a mobile object, the mobile object may be an arbitrary vehicle that can move by autonomous driving. For example, the mobile object may be an industrial robot, a humanoid robot, a drone, an aircraft, a helicopter, a ship, a submarine, and the like. In the embodiments of the present invention, although an example in which a mobile object and a monitoring control server used to remotely monitor and control the mobile object communicate via a wide area network (WAN) is illustrated, the mobile object and the monitoring control server may communicate via a local area network only.

Embodiment 1

Figure 1:
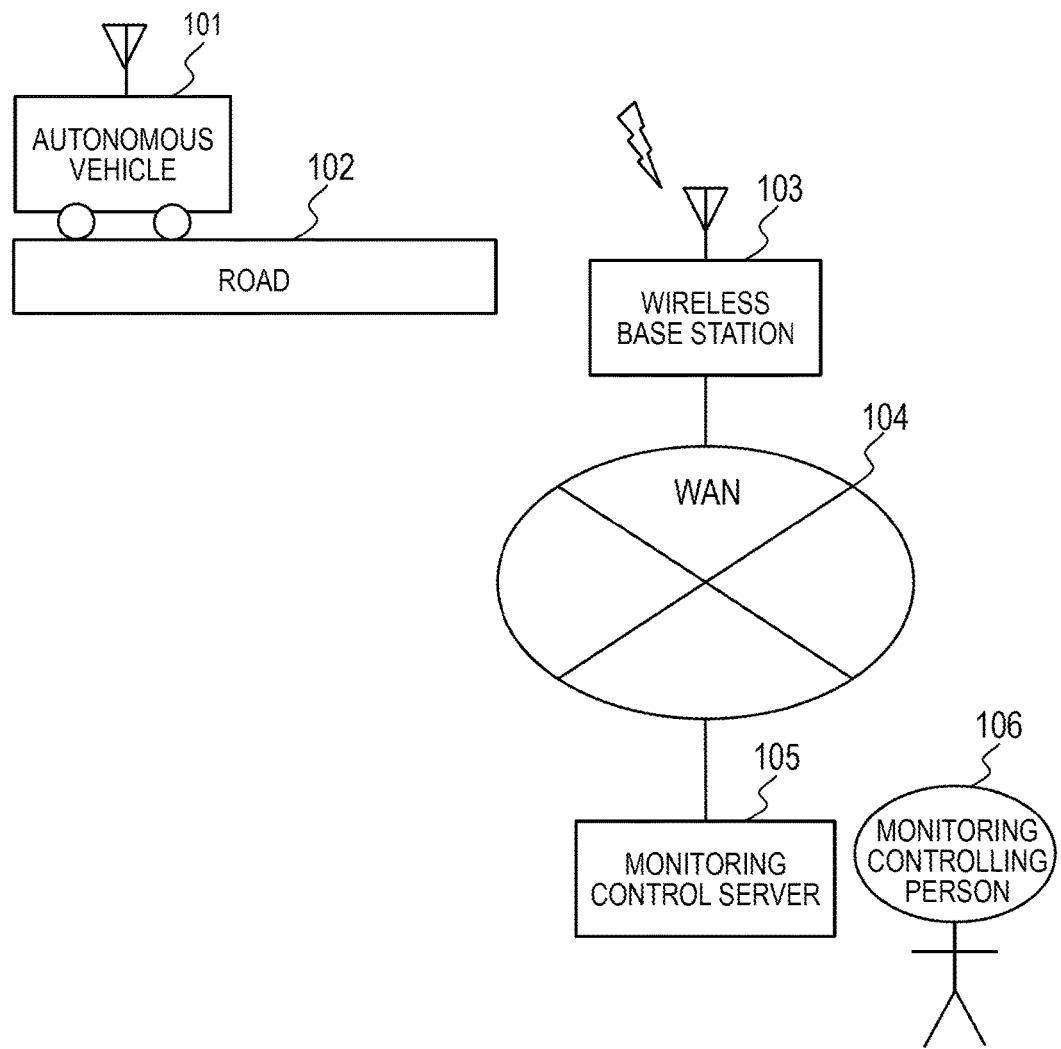
FIG. 1 is an explanatory diagram illustrating a configuration of an autonomous vehicle monitoring control system according to Embodiment 1 of the present invention.

FIG. 1 is an explanatory diagram illustrating a configuration of an autonomous vehicle monitoring control system according to Embodiment 1 of the present invention.

The autonomous vehicle monitoring control system includes an autonomous vehicle 101, a road 102, a radio base station 103, a WAN 104, a monitoring control server 105, and a monitoring controlling person 106. FIG. 1 illustrates an example only and respective elements in the drawings may be provided plurally. For example, a plurality of autonomous vehicles 101 may be present in a certain autonomous vehicle monitoring control system. For example, a plurality of monitoring control servers 105 may be present in a certain autonomous vehicle monitoring control system. The autonomous vehicle 101 is an automobile travelling on the road 102. The autonomous vehicle 101 travels by automated driving or remote control. The autonomous vehicle 101 connects to the monitoring control server 105 via a radio base station 103 and the WAN 104. The WAN 104 connects the radio base station 103 and the monitoring control server 105. The monitoring control server 105 displays information received from the autonomous vehicle 101. The monitoring control server 105 transmits information input by a monitoring controlling person 106 to the autonomous vehicle 101.

Figure 2:
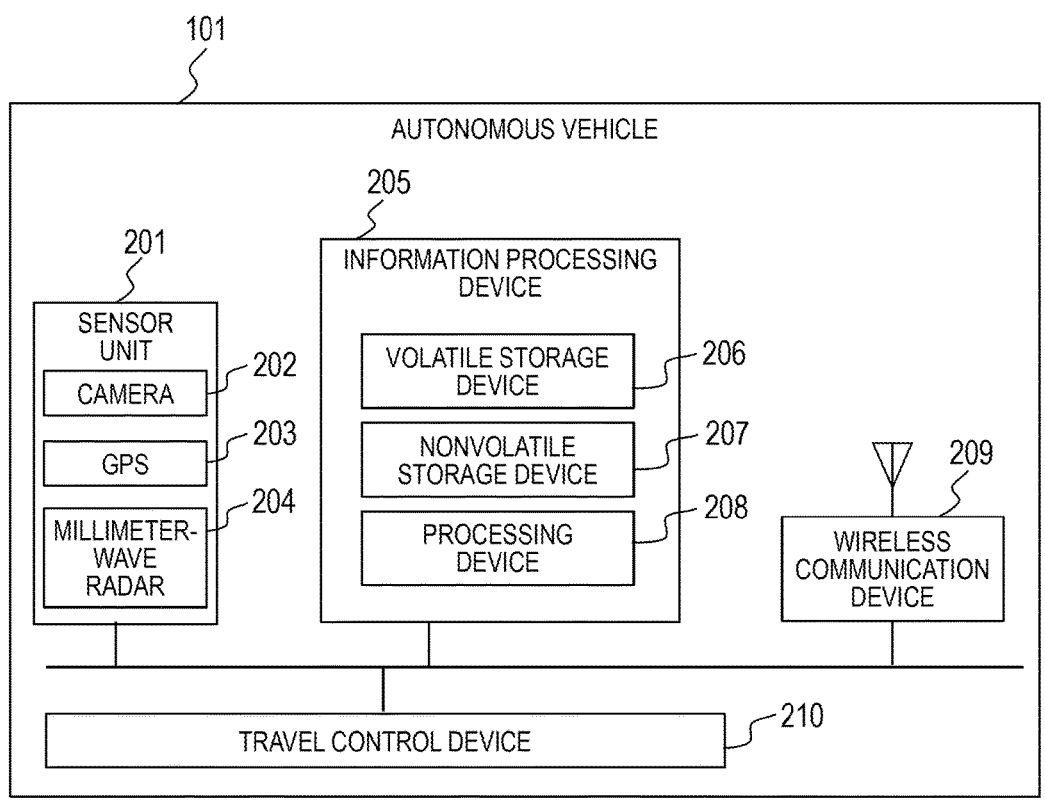
FIG. 2 is a block diagram illustrating a hardware configuration of an autonomous vehicle according to Embodiment 1 of the present invention.

FIG. 2 is a block diagram illustrating a hardware configuration of the autonomous vehicle 101 according to Embodiment 1 of the present invention.

The autonomous vehicle 101 includes a sensor unit 201, a camera 202, a global positioning system (GPS) 203, a millimeter-wave radar 204, an information processing device 205, a volatile storage device 206, a nonvolatile storage device 207, an arithmetic processing device 208, a wireless communication device 209, and a travel control device 210.

The sensor unit 201 is used for acquiring information on the surroundings of the autonomous vehicle 101. The sensor unit 201 includes the camera 202, the GPS 203, and the millimeter-wave radar 204. The sensor unit 201 may be configured as another sensor such as a light detection and ranging (LIDAR). The sensor unit 201 inputs the acquired sensor information to the information processing device 205. The camera 202 acquires image information of the surroundings of the autonomous vehicle 101. The GPS 203 is used for acquiring the present position information of the autonomous vehicle 101. The millimeter-wave radar 204 detects the positions of objects around the autonomous vehicle 101.

The information processing device 205 includes the volatile storage device 206, the nonvolatile storage device 207, and the arithmetic processing device 208. The volatile storage device 206 is used for storing programs executed by the arithmetic processing device 208 temporarily. The nonvolatile storage device 207 is used for storing information properly and corresponds to a hard disk or the like, for example. The arithmetic processing device 208 is a device that performs various arithmetic operations related to data processing.

The wireless communication device 209 is used for performing communication with the radio base station 103. The travel control device 210 executes control of travel-related operations such as acceleration, deceleration, turning, and the like.

Figure 3:
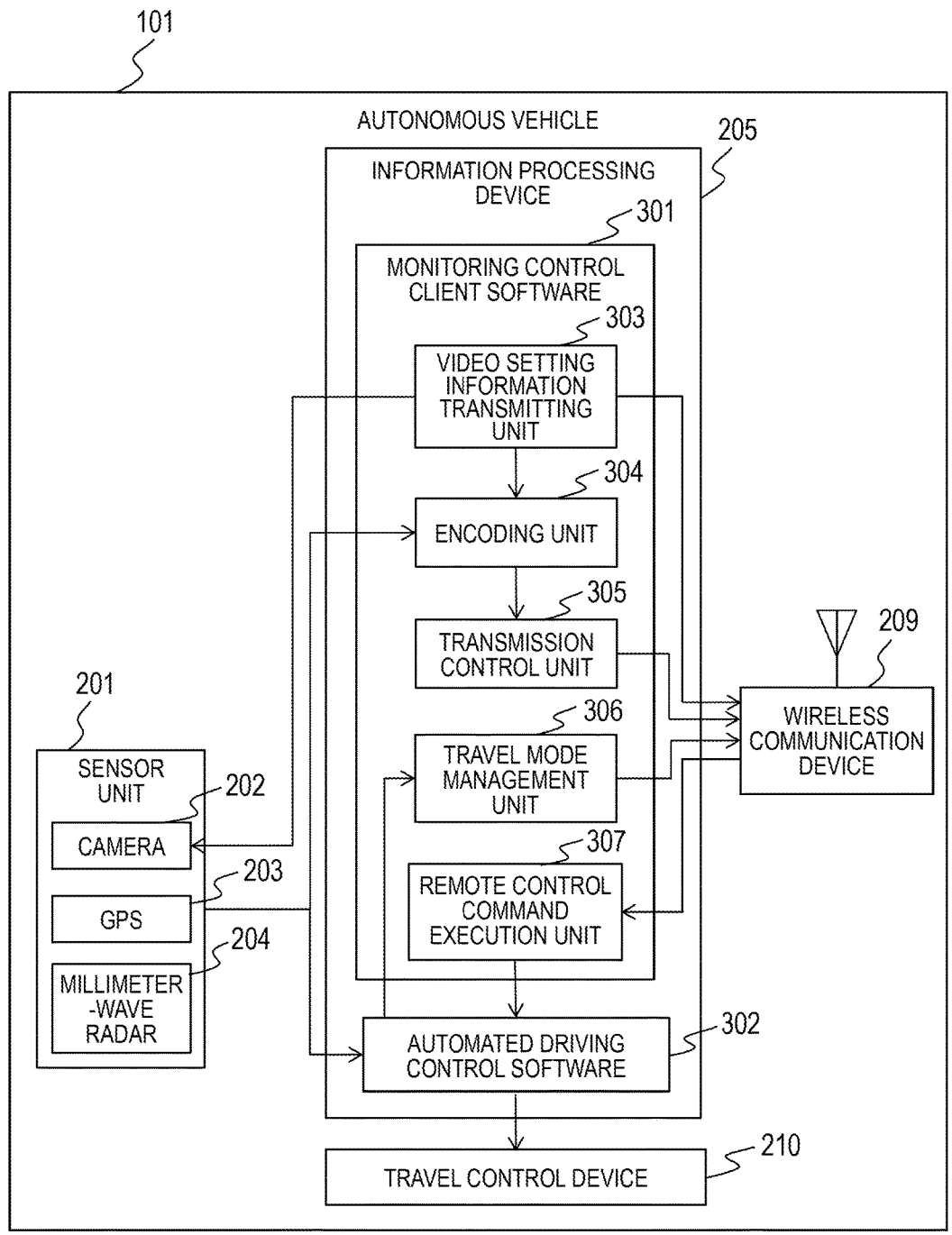
FIG. 3 is a block diagram illustrating the flow of data exchanged between respective hardware components that form the autonomous vehicle according to Embodiment 1 of the present invention and a configuration of a program executed by an information processing device.

FIG. 3 is a block diagram illustrating the flow of data exchanged between hardware components that form the autonomous vehicle 101 according to Embodiment 1 of the present invention and a configuration of a program executed by the information processing device 205.

Examples of software executed by the information processing device 205 include monitoring control client software 301 and automated driving control software 302.

The monitoring control client software 301 executes control of the camera 202 in the sensor unit 201. The monitoring control client software 301 encodes images input from the camera 202 and transmits the images to the monitoring control server 105 via the wireless communication device 209. The monitoring control client software 301 transmits information on encoding or decoding of images to the monitoring control server 105 via the wireless communication device 209. The monitoring control client software 301 receives a travel mode of the autonomous vehicle 101 from the automated driving control software 302 and transmits the travel mode to the monitoring control server 105 via the wireless communication device 209. The monitoring control client software 301 receives a control signal transmitted by the monitoring control server 105 via the wireless communication device 209 and inputs the control signal to the automated driving control software 302.

The monitoring control client software 301 includes a video setting information transmitting unit 303, an encoding unit 304, a transmission control unit 305, a travel mode management unit 306, and a remote control command execution unit 307. The video setting information transmitting unit 303 inputs a frame per second (fps) setting and a capturing start command to the camera 202. Upon receiving the capturing start command from the video setting information transmitting unit 303, the camera 202 performs capturing on the basis of the fps setting F [fps] and inputs the captured data (hereinafter referred to as image data) to the encoding unit 304.

The video setting information transmitting unit 303 inputs a key frame insertion interval G and an encoding start command to the encoding unit 304. The key frame insertion interval G is a value for determining how many pieces of image data successively input from the camera 202 will be used for generating a key frame at an interval. For example, when the frame insertion interval G is 5, one key frame is generated every five pieces of image data among the image data successively input from the camera 202. The video setting information transmitting unit 303 transmits an initial frame readout timing, a fps setting F [fps], and the key frame insertion interval G to the monitoring control server 105 via the wireless communication device 209.

Upon receiving the key frame insertion interval G and the encoding start command from the video setting information transmitting unit 303, the encoding unit 304 encodes the image data successively input from the camera 202 and inputs encoded frames to the transmission control unit 305. Specifically, the encoding process of the encoding unit 304 is executed such that a key frame is generated at an interval of every G images successively input from the camera 202 and difference frames are generated from the other images. The encoding unit 304 assigns a header made up of a frame type and a sequence number to the generated key frame and the difference frame and then inputs these frames to the transmission control unit 305.

Upon receiving frames from the encoding unit 304, the transmission control unit 305 performs a frame dividing process so that the size of a communication packet including the data of frames transmitted from the wireless communication device 209 does not exceed a predetermined packet size, assigns a header made up of the number of divisions and a serial number to respective packets including the divided frame data, and transmits the frames to the monitoring control server 105 via the wireless communication device 209.

The travel mode management unit 306 transmits the travel mode of the autonomous vehicle 101 input from the automated driving control software 302 to the monitoring control server 105 via the wireless communication device 209. The remote control command execution unit 307 inputs a remote control signal received from a monitoring control server via the wireless communication device 309 to the automated driving control software 302.

When the travel mode is automated driving, the automated driving control software 302 computes a future travelling route and the like on the basis of the sensor information input from the sensor unit 201, generates an acceleration/deceleration signal, a steering signal, and the like for controlling the vehicle on the basis of the route computation result, and inputs the signals to the travel control device 210. In this way, automated driving of the autonomous vehicle 101 is controlled. Moreover, when the travel mode is automated driving or remote-controlled driving, upon receiving a control signal from the remote control command execution unit 307, the automated driving control software 302 inputs the received control signal to the travel control device 210. In this way, remote-controlled driving of the autonomous vehicle 101 is controlled.

Hereinafter, the processes executed within the autonomous vehicle 101 according to the software are sometimes referred to as processes executed by the software (or a processor unit included therein) for the sake of convenience. However, actually, these processes are executed when the arithmetic processing device 208 of the information processing device 205 controls respective units in the autonomous vehicle 101 as necessary according to commands described in the software stored in the volatile storage device 206 and the like.

Hereinafter, the process flow of the encoding unit 304 and the transmission control unit 305 will be described.

Figure 4:
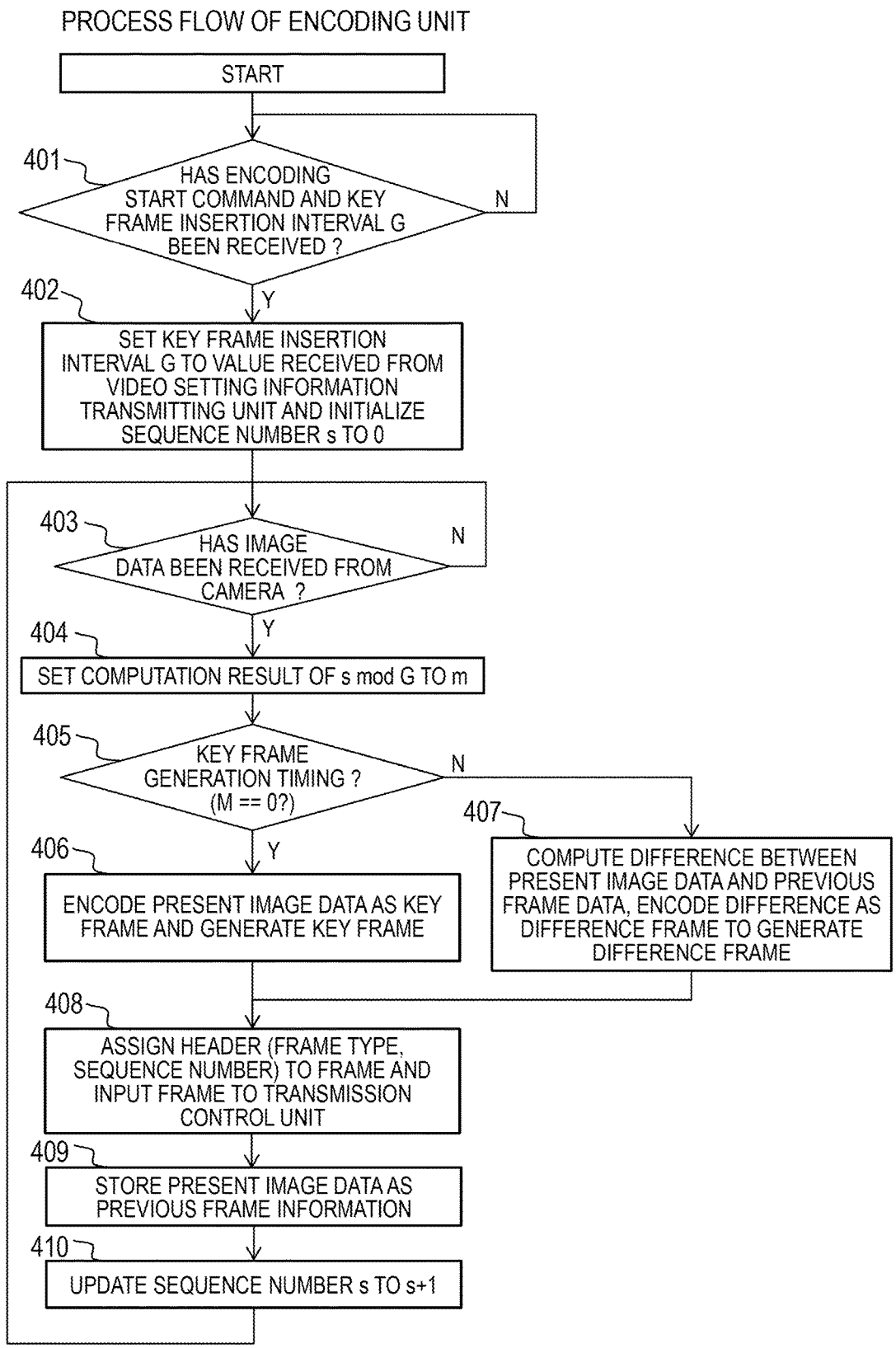
FIG. 4 is a flowchart illustrating the process of an encoding unit according to Embodiment 1 of the present invention.

FIG. 4 is a flowchart illustrating the process of the encoding unit 304 according to Embodiment 1 of the present invention.

When an operation starts, the encoding unit 304 determines whether an encoding start command and a key frame insertion interval G are received from the video setting information transmitting unit 303 (step 401). When it is determined in step 401 that the encoding start command and the key frame insertion interval G are not received (NO), the flow proceeds to step 401. When it is determined in step 401 that the encoding start command and the key frame insertion interval G are received (YES), the flow proceeds to step 402.

In step 402, the encoding unit 304 sets the key frame insertion interval G to a value received from the video setting information transmitting unit 303 and initializes the sequence number s to 0, and the flow proceeds to step 403. In step 403, the encoding unit 304 determines whether image data is received from the camera 202. When it is determined in step 403 that the image data is not received, the flow proceeds to step 403. When it is determined in step 403 that the image data is received, the flow proceeds to step 404. In step 404, the encoding unit 304 computes a value, "s mod G" (that is, a remainder after division of s by G) and outputs a computation result of m, and then, the flow proceeds to step 405.

In step 405, the encoding unit 304 determines whether the value of m is 0. When it is determined in step 405 that m is 0, the encoding unit 304 determines that a key frame generation timing has arrived, and the flow proceeds to step 406. When it is determined in step 405 that m is not 0, it is determined that a key frame generation timing has not arrived but a difference frame generation timing has arrived, and the flow proceeds to step 407.

In step 406, the encoding unit 304 encodes the received image data as a key frame to generate the key frame, and then, the flow proceeds to step 408.

In step 407, the encoding unit 304 computes a difference between the received image data and previous frame data, encodes the difference as a difference frame, and generates a difference frame, and then, the flow proceeds to step 408. In step 408, the encoding unit 304 assigns a header compose of a frame type and a sequence number to the key frame generated in step 406 or the difference frame generated in step 407 and inputs the frame to the transmission control unit 305, and then, the flow proceeds to step 409. In the header of the frame type, a key frame or a difference frame is designated as the type of the frame. The sequence number s is stored in the header of the sequence number. In step 409, the encoding unit 304 stores the image data as previous frame information, and then, the flow proceeds to step 410. In step 410, the encoding unit 304 updates the sequence number s to s+1 and the flow proceeds to step 403.

Figure 5:
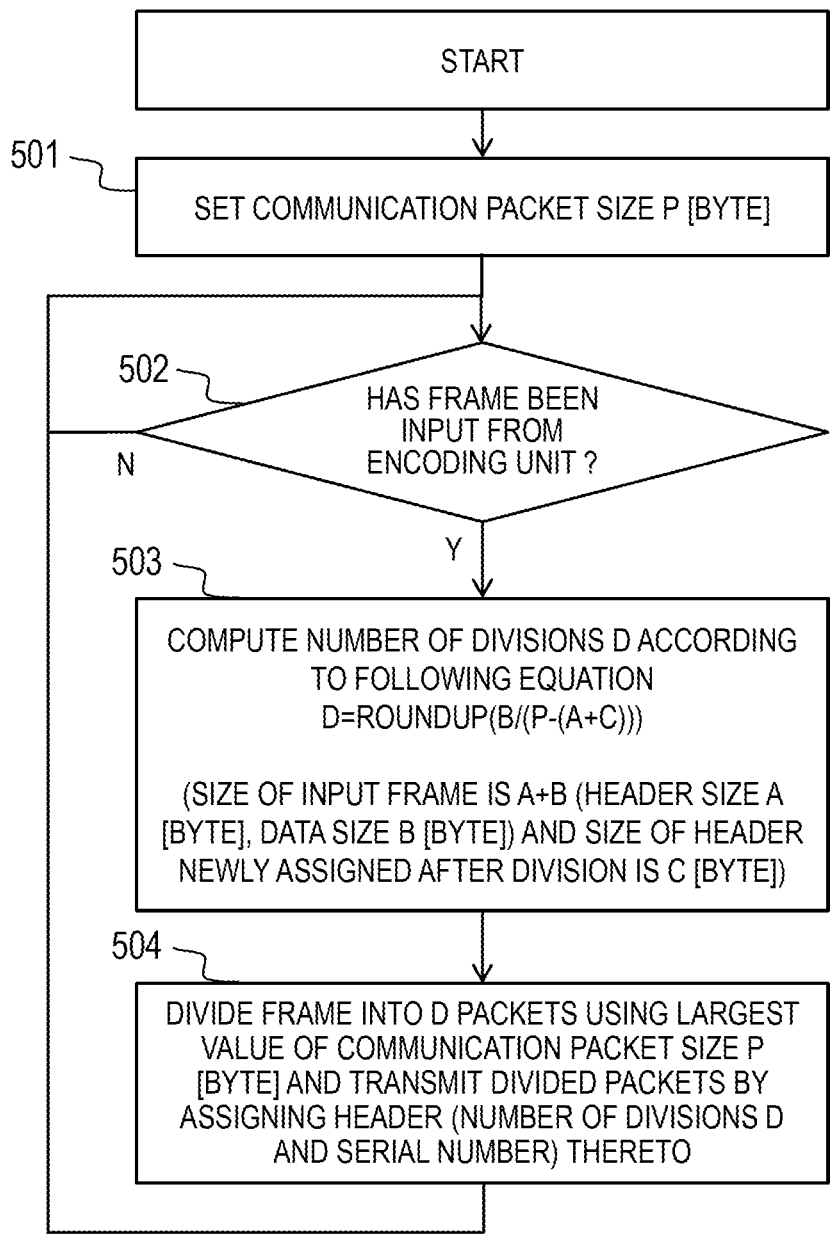
FIG. 5 is a flowchart illustrating the process of a transmission control unit according to Embodiment 1 of the present invention.

FIG. 5 is a flowchart illustrating the process of the transmission control unit 305 according to Embodiment 1 of the present invention.

When an operation starts, the transmission control unit 305 sets the communication packet size P [Byte] to a predetermined value in step 501, and the flow proceeds to step 502. In step 502, the transmission control unit 305 determines whether a frame is input from the encoding unit 304. When it is determined in step 502 that the frame is input, the flow proceeds to step 503. When it is determined in step 502 that the frame is not input, the flow proceeds to step 502. In step 503, the transmission control unit 305 computes the number of divisions D by D=ROUNDUP(B÷(P−(A+C)). Here, ROUNDUP is a function of rounding an input value up to the next higher integer. For example, if D=ROUNDUP(3.1), D=4. Moreover, if D=ROUNDUP (3.0), D=3. Here, the size of an input frame is A+B (that is, the size of a header portion is A [Byte] and the size of a data portion is B [Byte]), and the size of a newly assigned header portion after division is C [Byte].

In step 504, the transmission control unit 305 divides the frame into D packets so that the size of respective packets does not exceed a largest value P [Byte] of a communication packet size, assigns a header (the number of divisions D and a serial number) to the divided packets, and transmits the packets, and then, the flow proceeds to step 502.

Figure 6:
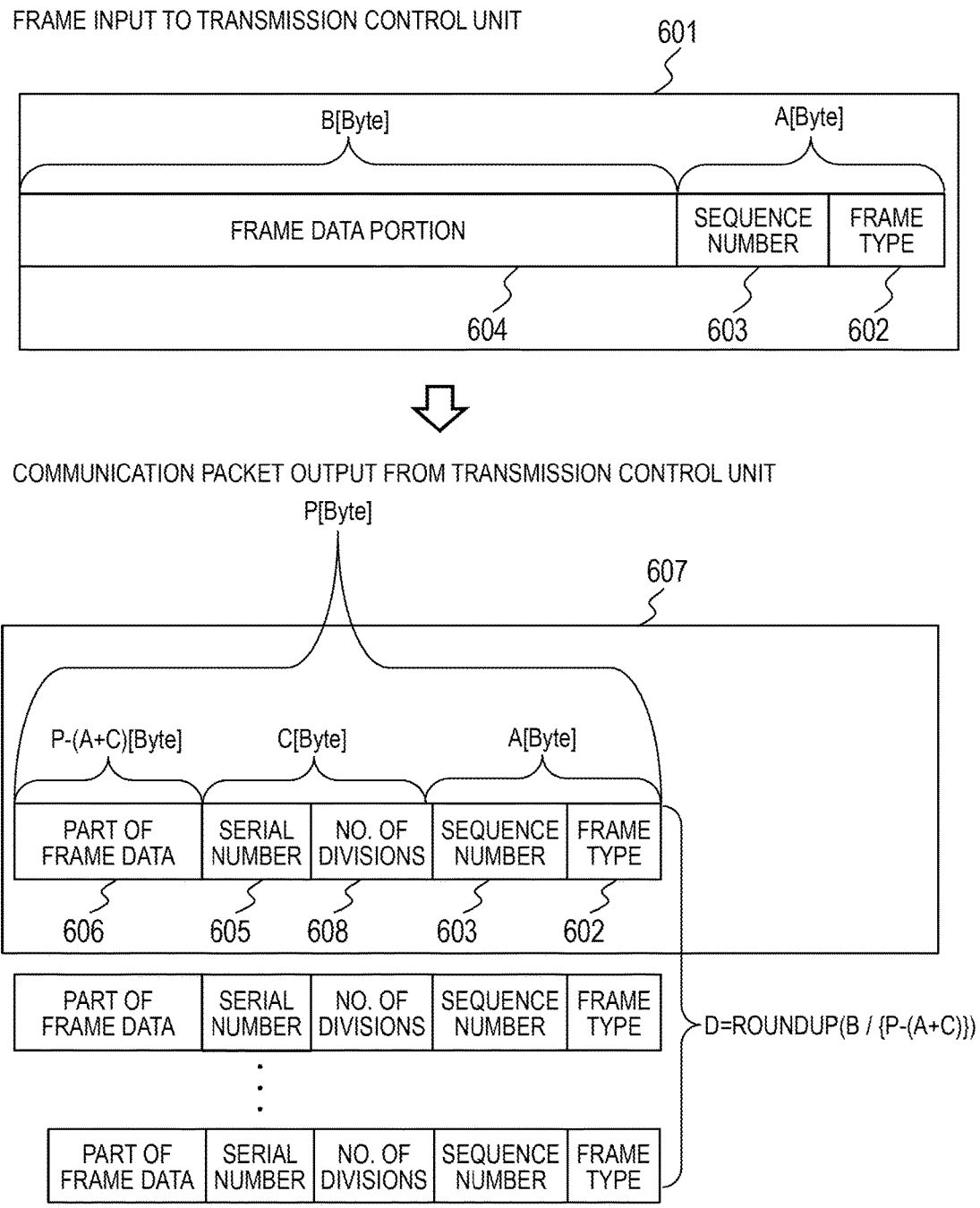
FIG. 6 is an explanatory diagram illustrating a frame that an encoding unit according to Embodiment 1 of the present invention generates and inputs to a transmission control unit and a communication packet that the transmission control unit generates and inputs to a wireless communication device.

FIG. 6 is an explanatory diagram illustrating a frame that the encoding unit 304 according to Embodiment 1 of the present invention generates and inputs to the transmission control unit 305 and a communication packet that the transmission control unit 305 generates and inputs to the wireless communication device 209.

A frame 601 is a frame that the encoding unit 304 generates and inputs to the transmission control unit 305. The frame 601 includes a frame type 602, a sequence number 603, and a frame data portion 604. A value indicating a key frame is stored in the frame type 602 when the frame is a key frame, and a value indicating a difference frame is stored therein when the frame is a difference frame. A series of sequence numbers computed by and stored in the encoding unit are stored in the sequence number 603. The size of a header portion combining both the frame type 602 and the sequence number 603 is a fixed length of A [Byte]. The frame data portion 604 has a different size for respective frames. In this example, the size of the frame data portion 604 is B [Byte].

The communication packet 607 is a communication packet that the transmission control unit 305 generates and inputs to the wireless communication device 209. The communication packet 607 includes the frame type 602, the sequence number 603, the number of divisions 608, the serial number 605, and a part of data frame 606. The same pieces of information as those stored in the frame 601 are stored with respect to the frame type 602 and the sequence number 603. In step 503, a value of D=ROUNDUP(B/(P−(A+C)) is stored in the number of divisions 608. Values of serial numbers for identifying respective communication packets among the plurality of communication packets generated by dividing one frame are stored in the serial number 605. Data generated by dividing the frame data portion 604 is stored in the part of frame data 606.

Figure 7:
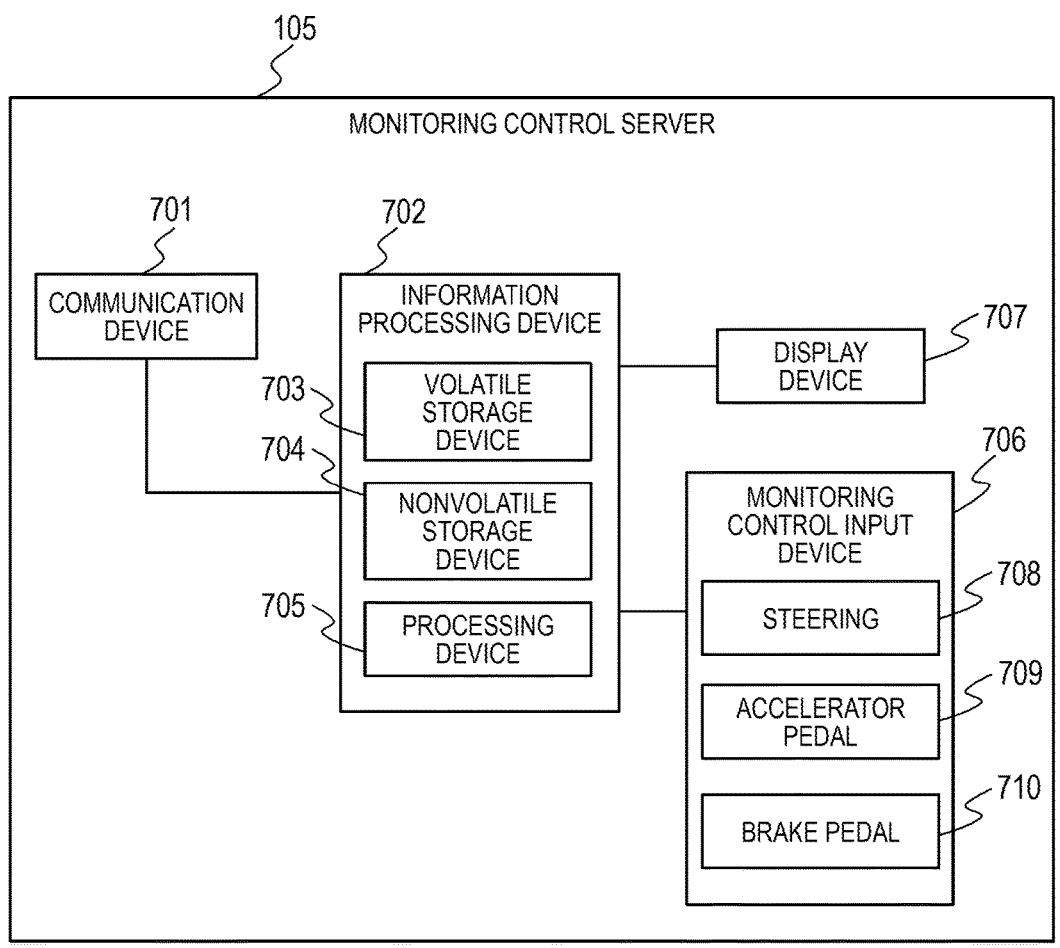
FIG. 7 is a block diagram illustrating a hardware configuration of a monitoring control server according to Embodiment 1 of the present invention.

FIG. 7 is a block diagram illustrating a hardware configuration of the monitoring control server 105 according to Embodiment 1 of the present invention.

The monitoring control server 105 includes a communication device 701, an information processing device 702, a volatile storage device 703, a nonvolatile storage device 704, an arithmetic processing device 705, a monitoring control input device 706, a display device 707, a steering 708, an accelerator pedal 709, and a brake pedal 710. The communication device 701 connects to the WAN 104 and performs communication with the autonomous vehicle 101 via the radio base station 103.

The information processing device 702 includes the volatile storage device 703, the nonvolatile storage device 704, and the arithmetic processing device 705. The volatile storage device 703 is used for storing programs executed by the arithmetic processing device 705 temporarily. The nonvolatile storage device 704 is used for storing information properly and corresponds to a hard disk or the like, for example. The arithmetic processing device 705 is a device that performs various arithmetic operations related to data processing. The display device 707 is a device for displaying videos (images), travelling state information, and the like received from the autonomous vehicle 101.

The monitoring control input device 706 is a device for inputting information used for the monitoring controlling person 106 to control the autonomous vehicle 101. The monitoring control input device 706 includes a steering 708, an accelerator pedal 709, a brake pedal 710, and the like. The steering 708 is a device for allowing the monitoring controlling person 106 to steer the autonomous vehicle 101. The accelerator pedal 709 is a device for allowing the monitoring controlling person 106 to accelerate the autonomous vehicle 101. The brake pedal 710 is a device for allowing the monitoring controlling person 106 to decelerate the autonomous vehicle 101.

Figure 8:
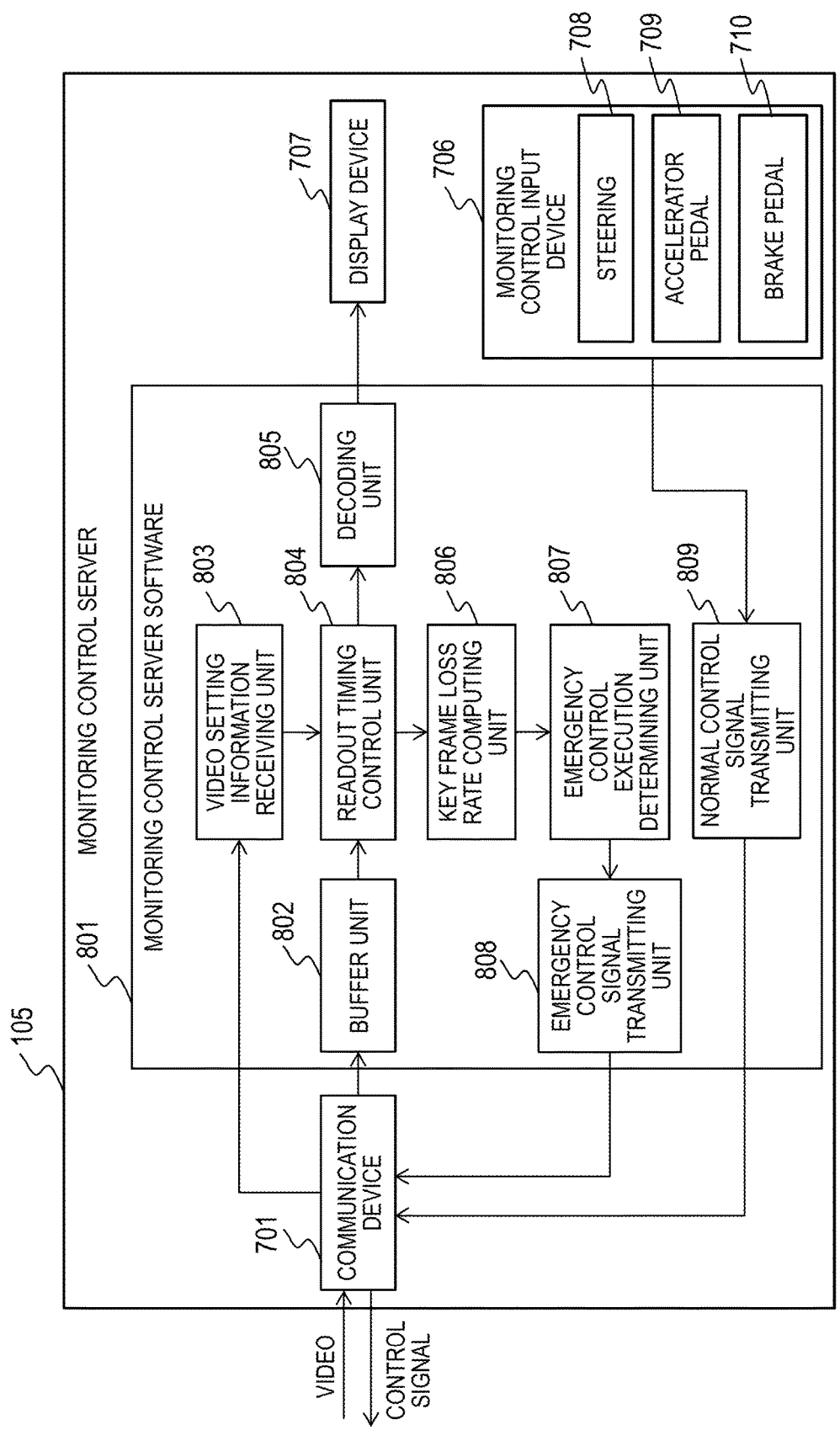
FIG. 8 is a block diagram illustrating the flow of data exchanged between respective hardware components that form the monitoring control server according to Embodiment 1 of the present invention and a configuration of a program executed by an information processing device.

FIG. 8 is a block diagram illustrating the flow of data exchanged between respective hardware components that form the monitoring control server 105 according to Embodiment 1 of the present invention and a configuration of a program executed by the information processing device 702.

The monitoring control server software 801 is a program executed in the information processing device 702. The monitoring control server software 801 is a program for executing a process related to monitoring control of the autonomous vehicle 101. The monitoring control server software 801 includes a buffer unit 802, a video setting information receiving unit 803, a readout timing control unit 804, a decoding unit 805, a key frame loss rate computing unit 806, an emergency control execution determining unit 807, an emergency control signal transmitting unit 808, and a normal control signal transmitting unit 809.

The buffer unit 802 buffers the frames input from the communication device 701 by sorting the same by a sequence number. Upon receiving an initial frame readout timing, the fps setting F [fps], and the key frame insertion interval G from the communication device 701, the video setting information receiving unit 803 records the received initial frame readout timing, the fps setting F, and the key frame insertion interval G. Moreover, the video setting information receiving unit 803 computes a frame readout interval from the received fps setting F and records the same. Moreover, the video setting information receiving unit 803 inputs the received initial frame readout timing to the readout timing control unit 804.

The readout timing control unit 804 reads the frames accumulated in the buffer unit 802 according to the initial frame readout timing input from the video setting information receiving unit 803 and inputs the read frames to the decoding unit 805 and the key frame loss rate computing unit 806. The decoding unit 805 removes a header including the number of divisions and a serial number of each frame of a frame group having the same sequence number to reconstruct an original frame, decodes the frame, and inputs the decoded frame to the display device 707. The key frame loss rate computing unit 806 computes a key frame loss rate from the number of divisions of the frame group having the same sequence number input from the readout timing control unit 804 and the input frame group and inputs the computed key frame loss rate to the emergency control execution determining unit.

The emergency control execution determining unit 807 compares a predetermined key frame loss rate threshold with the input key frame loss rate, and determines an emergency control method when the key frame loss rate is equal to or larger than the key frame loss rate threshold, and notifies the emergency control signal transmitting unit 808 of the determined emergency control method. Here, the emergency control method is determined in advance, and emergency stop, speed limiter control, and the like are examples thereof. Upon receiving an emergency control execution command from the emergency control execution determining unit 807, the emergency control signal transmitting unit 808 generates a communication packet corresponding to the emergency control execution command and transmits the communication packet to the autonomous vehicle 101 via the communication device 701.

Hereinafter, the processes executed within the monitoring control server 105 according to the software are sometimes referred to as processes executed by the software (or a processor unit included therein) for the sake of convenience. However, actually, these processes are executed by the arithmetic processing device 705 of the information processing device 702 controls respective units in the monitoring control server 105 as necessary according to commands described in the software stored in the volatile storage device 703 and the like.

Figure 9:
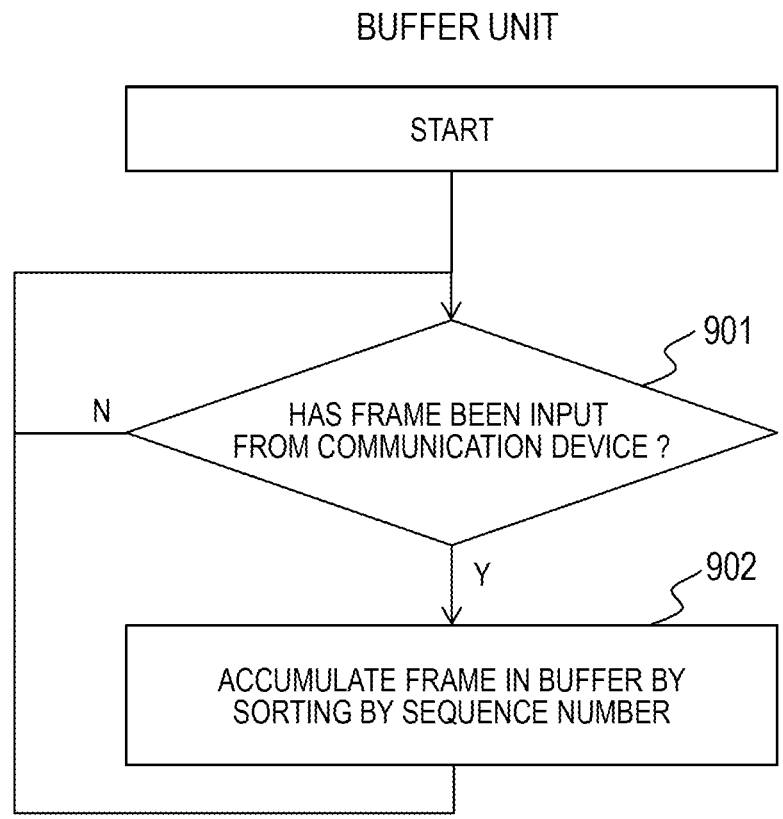
FIG. 9 is a flowchart illustrating the process of a buffer unit according to Embodiment 1 of the present invention.

FIG. 9 is a flowchart illustrating the process of the buffer unit 802 according to Embodiment 1 of the present invention.

When an operation starts, the buffer unit 802 determines whether a frame is input from the communication device 701 (step 901). When it is determined in 901 that a frame is input, the flow proceeds to step 902. When it is determined in 901 that a frame is not input, the flow proceeds to step 901 again. In step 902, the buffer unit 802 sorts the input frames by a frame sequence number and accumulates the frames in a buffer.

Figure 10:
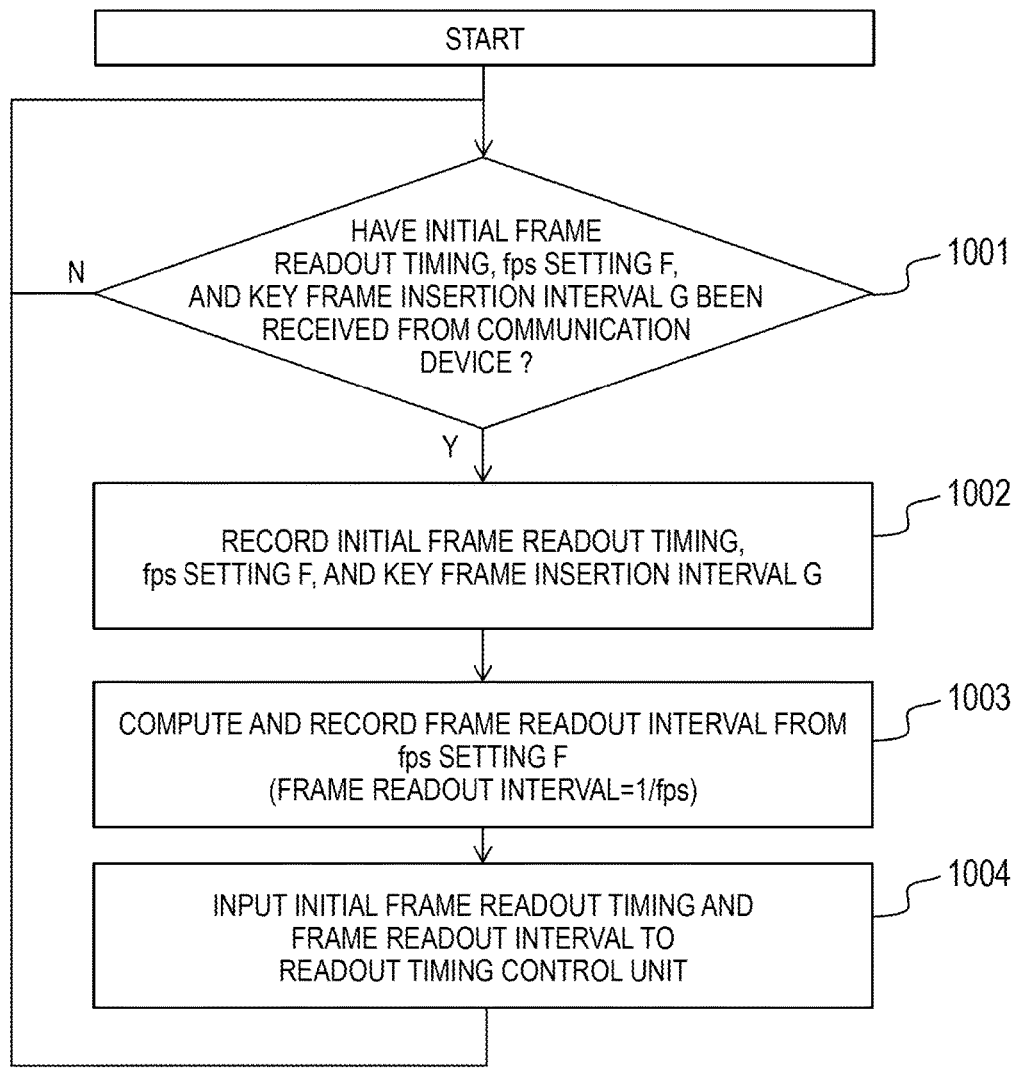
FIG. 10 is a flowchart illustrating the process of a video setting information receiving unit according to Embodiment 1 of the present invention.

FIG. 10 is a flowchart illustrating the process of the video setting information receiving unit 803 according to Embodiment 1 of the present invention.

When an operation starts, the video setting information receiving unit 803 determines whether an initial readout timing, a fps setting F [fps], a key frame insertion interval G are received from the communication device 701 (step 1001). When it is determined in step 1001 that the initial readout timing, the fps setting F, the key frame insertion interval G are received, the flow proceeds to step 1002. When it is determined in step 1001 that the initial readout timing, the fps setting F, the key frame insertion interval G are not received, the flow proceeds to step 1001 again.

In step 1002, the video setting information receiving unit 803 records the initial frame readout timing, the fps setting F, and the key frame insertion interval G and the flow proceeds to step 1003. In step 1003, the video setting information receiving unit 803 computes a frame readout interval from the fps setting F and records the frame readout interval, and the flow proceeds to step 1004. Specifically, the video setting information receiving unit 803 computes a value of 1÷F as the frame readout interval. In step 1004, the video setting information receiving unit 803 inputs the initial frame readout timing and the frame readout interval to the readout timing control unit 804.

Figure 11:
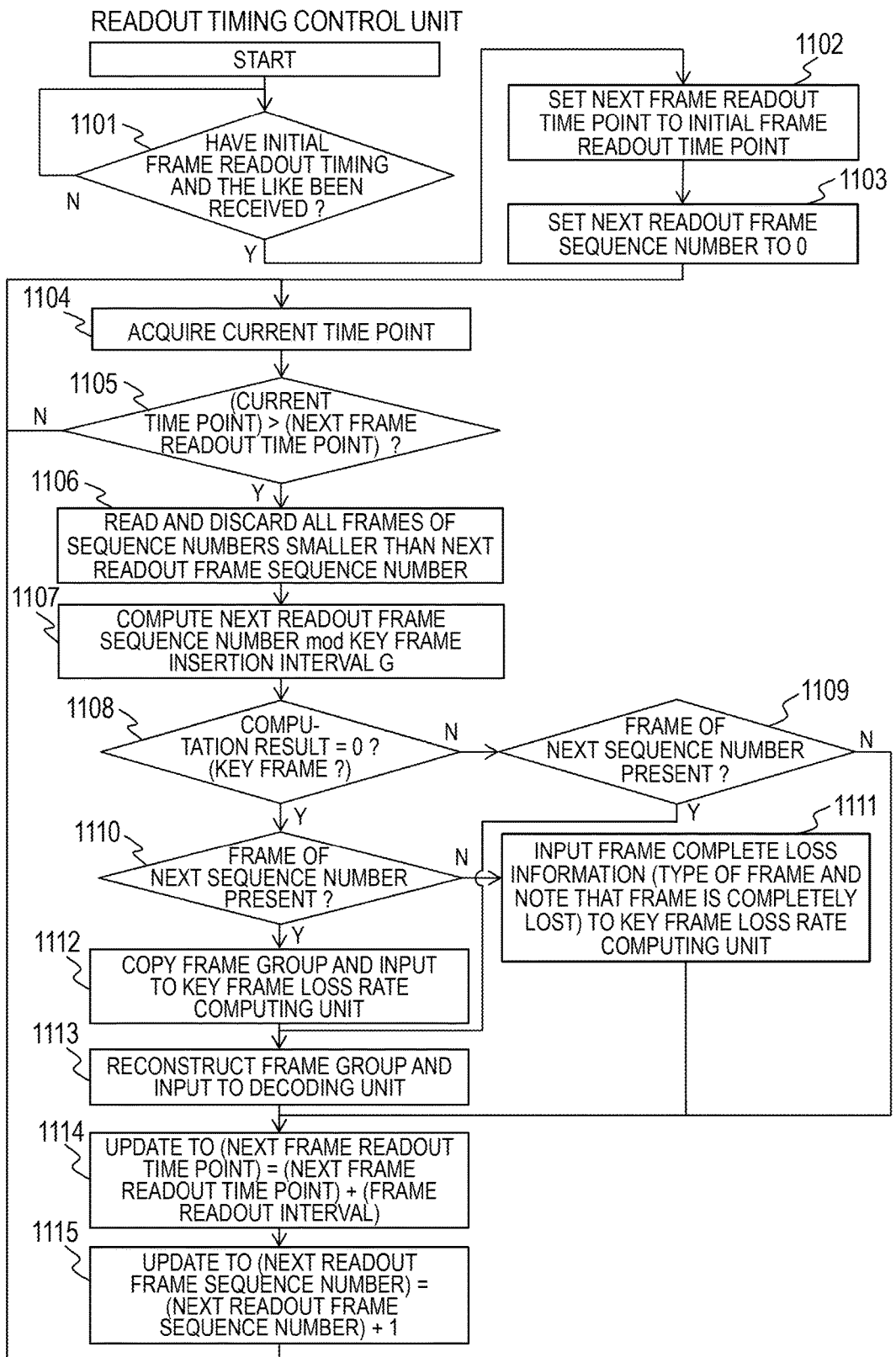
FIG. 11 is a flowchart illustrating the process of a readout timing control unit according to Embodiment 1 of the present invention.

FIG. 11 is a flowchart illustrating the process of the readout timing control unit 804 according to Embodiment 1 of the present invention.

When an operation starts, the readout timing control unit 804 determines whether the initial frame readout timing and the frame readout interval are received from the video setting information receiving unit 803 (step 1101). When it is determined in step 1101 that the initial frame readout timing and the frame readout interval are received, the flow proceeds to step 1102. When it is determined in step 1101 that the initial frame readout timing and the frame readout interval are not received, the flow proceeds to step 1101 again.

In step 1102, the readout timing control unit 804 sets a next frame readout time point to an initial frame readout time point and the flow proceeds to step 1103. In step 1103, the readout timing control unit 804 sets the next readout frame sequence number to 0 and the flow proceeds to step 1104. In step 1104, the readout timing control unit 804 acquires a present time point and the flow proceeds to step 1105.

In step 1105, the readout timing control unit 804 determines whether the present time point is larger than the next frame readout time point. When it is determined in step 1105 that the present time point is larger than the next frame readout time point (that is, the next frame readout time point has arrived), the flow proceeds to step 1106. When it is determined in step 1105 that the present time point is not larger than the next frame readout time point, the flow proceeds to step 1104.

In step 1106, the readout timing control unit 804 reads and discards all frames having a smaller sequence number than the next readout frame sequence number and the flow proceeds to step 1107. In step 1107, the readout timing control unit 804 computes "(next readout frame sequence number) mod (key frame insertion interval G)" and the flow proceeds to step 1108. In step 1108, the readout timing control unit 804 determines whether the computation result in step 1107 is 0 (that is, the next readout frame is a key frame). When it is determined in step 1108 that the computation result is 0 (that is, the next readout frame is a key frame), the flow proceeds to step 1110. When it is determined in step 1108 that the computation result is not 0 (that is, the next readout frame is not a key frame), the flow proceeds to step 1109.

In step 1109, the readout timing control unit 804 determines whether a frame of the next readout frame sequence number is present. When it is determined in step 1109 that the frame of the next readout frame sequence number is present, the flow proceeds to step 1113. When it is determined in step 1109 that the frame of the next readout frame sequence number is not present, the flow proceeds to step 1114.

In step 1110, the readout timing control unit 804 determines whether the frame of the next readout frame sequence number is present. When it is determined in step 1110 that the frame of the next readout frame sequence number is present, the flow proceeds to step 1112. When it is determined in step 1110 that the frame of the next readout frame sequence number is not present (that is, the key frame is lost), the flow proceeds to step 1111. In step 1111, the readout timing control unit 804 inputs the frame complete loss information to the key frame loss rate computing unit 806, and the flow proceeds to step 1114.

In step 1112, the readout timing control unit 804 copies a frame group of the next readout frame sequence number and inputs the same to the key frame loss rate computing unit 806, and the flow proceeds to step 1113. In step 1113, the input frame group is reconstructed and input to the decoding unit. In step 1114, the readout timing control unit 804 updates the next frame readout time point to "(next frame readout time point)+(frame readout interval)" and the flow proceeds to step 1115. In step 1115, the readout timing control unit 804 updates the next readout frame sequence number to "(next readout frame sequence number)+1" and the flow proceeds to step 1104.

Figure 12:
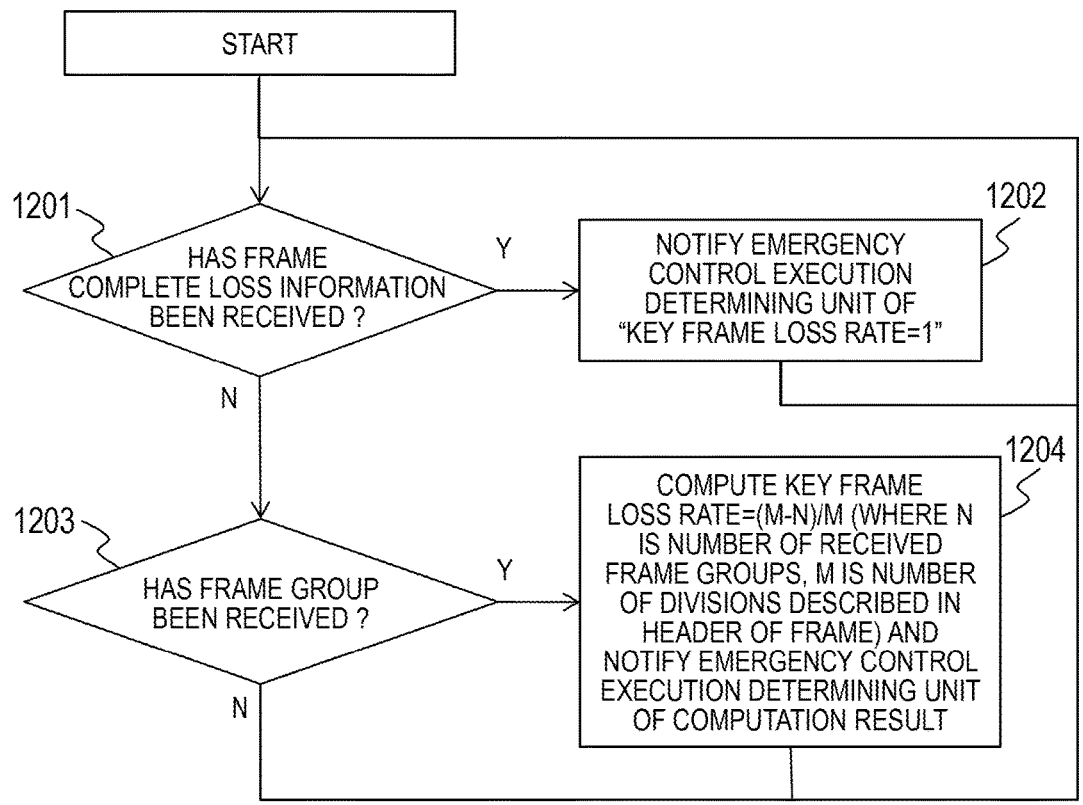
FIG. 12 is a flowchart illustrating the process of a key frame loss rate computing unit according to Embodiment 1 of the present invention.

FIG. 12 is a flowchart illustrating the process of the key frame loss rate computing unit 806 according to Embodiment 1 of the present invention.

When an operation starts, the key frame loss rate computing unit 806 determines whether the frame complete loss information is received from the readout timing control unit (step 1201). When it is determined in step 1201 that the frame complete loss information is received (that is, the key frame is lost), the flow proceeds to step 1202. When it is determined in step 1201 that the frame complete loss information is not received, the flow proceeds to step 1203.

In step 1202, the key frame loss rate computing unit 806 notifies the emergency control execution determining unit 807 of the key frame loss rate being 1. In step 1203, the key frame loss rate computing unit 806 determines whether the frame group is received from the readout timing control unit 804. When it is determined in step 1203 that the frame group is received, the flow proceeds to step 1204. When it is determined in step 1203 that the frame group is not received, the flow proceeds to step 1201.

In step 1204, the key frame loss rate computing unit 806 calculates the key frame loss rate by computing (M−N)÷M (where N is the number of received frame groups and M is the number of divisions described in a header of a certain frame) and notifies the emergency control execution determining unit 807 of the calculated key frame loss rate, and the flow proceeds to 1201.

Figure 13:
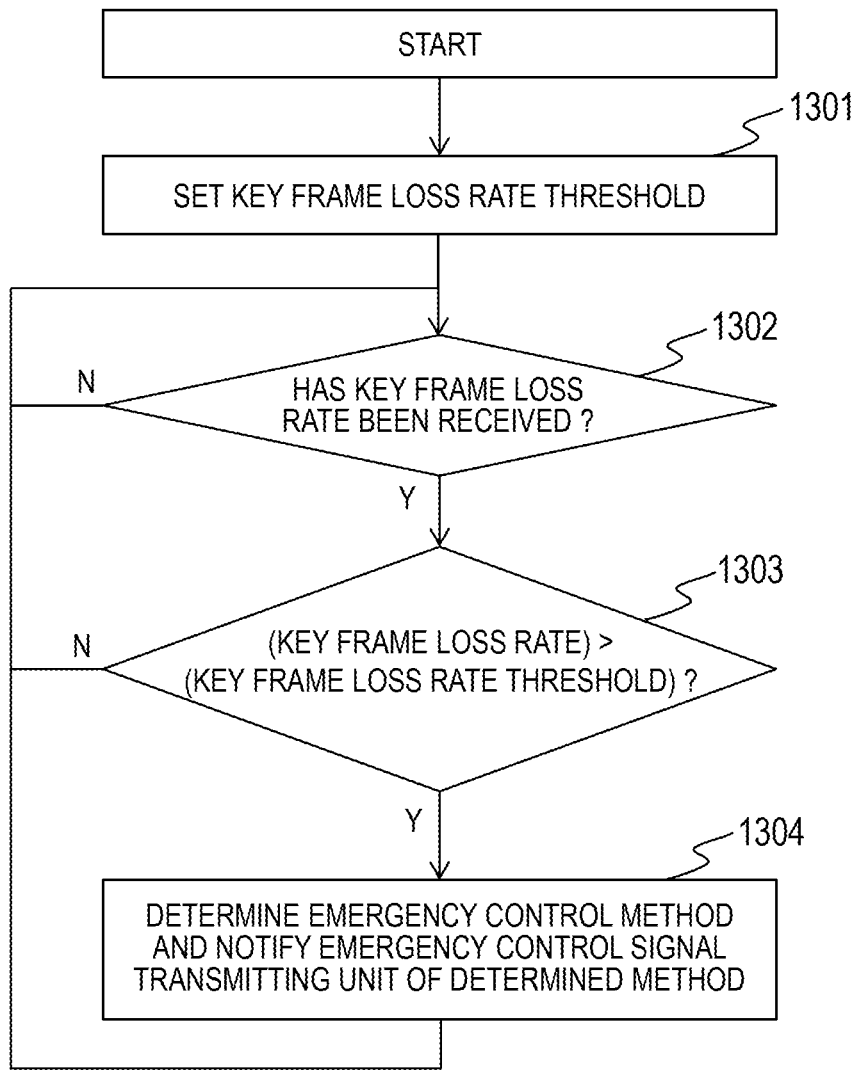
FIG. 13 is a flowchart illustrating the process of an emergency control execution determining unit according to Embodiment 1 of the present invention.

FIG. 13 is a flowchart illustrating the process of the emergency control execution determining unit 807 according to Embodiment 1 of the present invention.

When an operation starts, the emergency control execution determining unit 807 sets a key frame loss rate threshold (step 1301) and the flow proceeds to step 1302. In step 1302, the emergency control execution determining unit 807 determines whether the key frame loss rate is received. When it is determined in step 1302 that the key frame loss rate is received, the flow proceeds to step 1303. When it is determined in step 1302 that the key frame loss rate is not received, the flow proceeds to step 1302.

In step 1303, the emergency control execution determining unit 807 determines whether the key frame loss rate is larger than the key frame loss rate threshold. When it is determined in step 1303 that the key frame loss rate is larger than the key frame loss rate threshold, the flow proceeds to step 1304 since the quality of an image decoded by the decoding unit 805 and displayed by the display device 707 on the basis of the received image data does not satisfy a requirement required for realizing safe remote-controlled driving (that is, it is necessary to execute certain emergency control in order to secure safety of remote-controlled driving). When it is determined in step 1303 that the key frame loss rate is not larger than the key frame loss rate threshold, the flow proceeds to step 1302. In step 1304, the emergency control execution determining unit 807 determines an emergency control method and notifies the emergency control signal transmitting unit of the determined emergency control method and the flow proceeds to step 1302.

Figure 14:
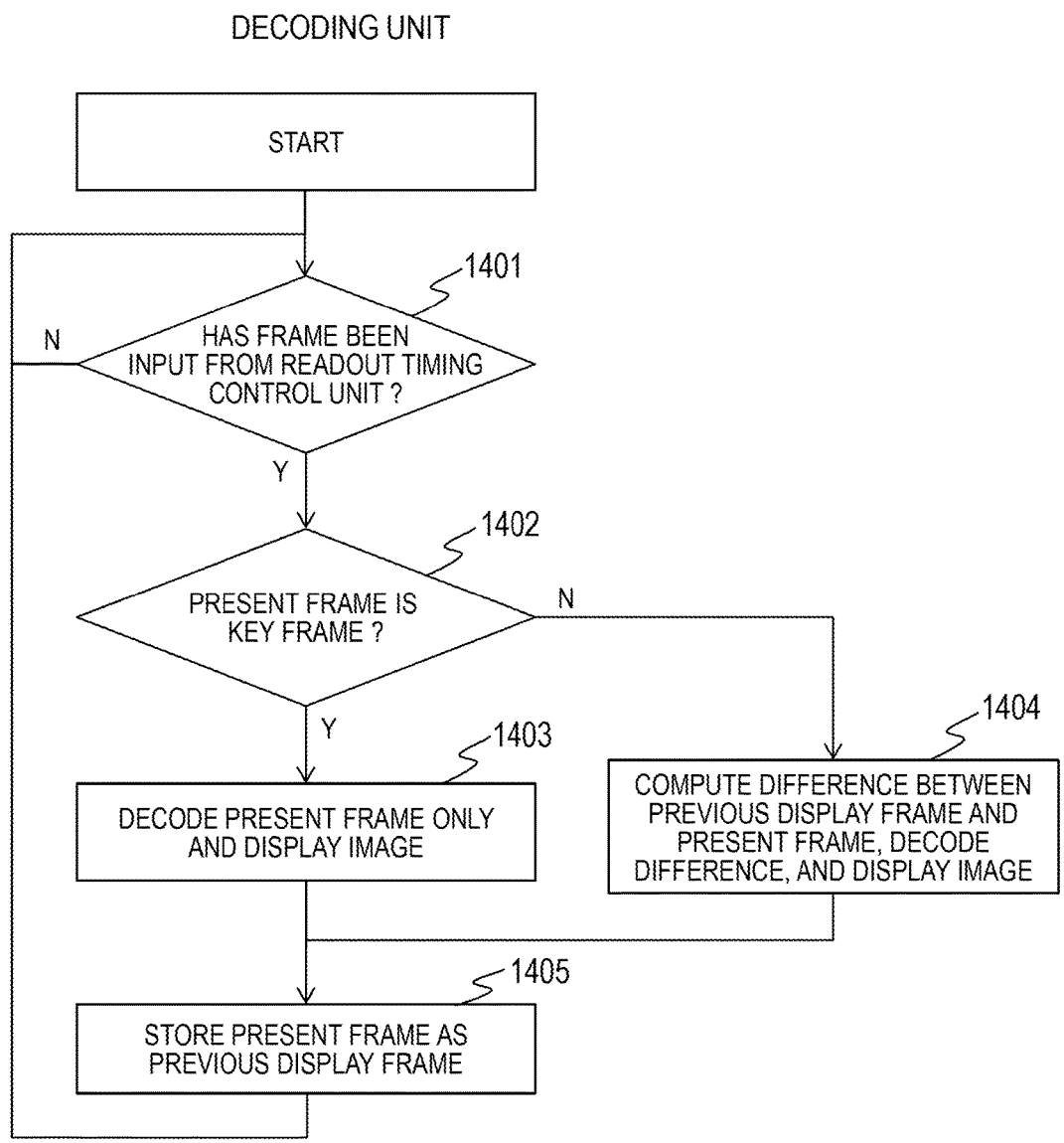
FIG. 14 is a flowchart illustrating the process of a decoding unit according to Embodiment 1 of the present invention.

FIG. 14 is a flowchart illustrating the process of the decoding unit 805 according to Embodiment 1 of the present invention.

When an operation starts, the decoding unit 805 determines whether a frame is input from the readout timing control unit 804 (step 1401). When it is determined in step 1401 that a frame is input, the flow proceeds to step 1402. When it is determined in step 1401 that a frame is not input, the flow proceeds to step 1401.

In step 1402, the decoding unit 805 determines whether the type of the input frame is a key frame. When it is determined in step 1402 that the type of the frame is a key frame, the flow proceeds to step 1403. When it is determined in step 1402 that the type of the frame is not a key frame (that is, a difference frame), the flow proceeds to step 1404.

In step 1403, the decoding unit 805 decodes the frame only and displays an image and the flow proceeds to step 1405. In step 1404, the decoding unit 805 computes a difference between a previously displayed frame and the frame, decodes the difference, and displays an image and the flow proceeds to step 1405. In step 1405, the frame is stored as a previous display frame and the flow proceeds to step 1401.

Here, according to a compression method such as MPEG which includes a key frame and a difference frame, the degree of influence on the quality of an image to be displayed is different depending on whether the key frame is lost or the difference frame is lost. When a key frame is present, the key frame only is decoded and an image is displayed. Since a difference frame contains difference information from the key frame only, both the key frame and the difference frame are decoded whereby an image is displayed. For efficient compression, the number of difference frames is larger than that of key frames. When a part of or an entire part of a certain key frame is lost, the lost information has an influence on an image reproduced from the difference frame until the next key frame is received, the degree of influence is large. On the other hand, when a part of or an entire part of a certain difference frame is lost, although it is not possible to reproduce the frame completely, since the lost information has little influence on reproduction of the next difference frame, the degree of influence of the difference frame is smaller than that of the key frame. From the above, although the degree of influence on deterioration of image quality increases when deterioration of communication quality occurs during transmission of a key frame, the degree of influence on deterioration of image quality decreases when deterioration of communication quality occurs during transmission of a difference frame.

Description of Specific Example of Embodiment 1

Figure 15:
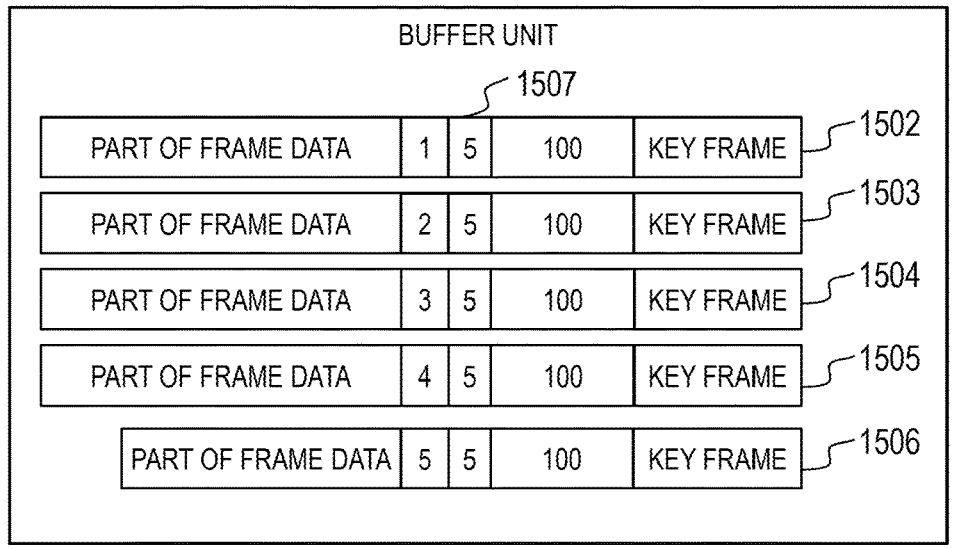
FIG. 15 is an explanatory diagram of an example of a frame buffered to a buffer unit according to Embodiment 1 of the present invention.
Figure 16:
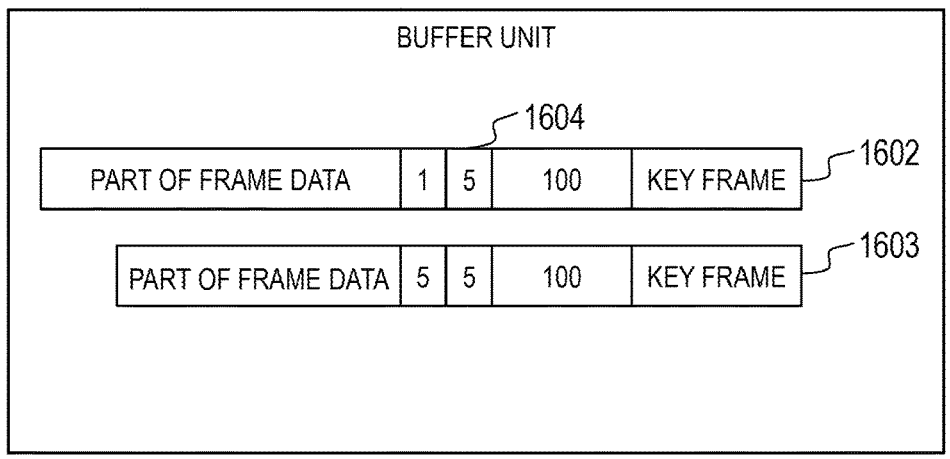
FIG. 16 is an explanatory diagram of an example of a frame buffered to a buffer unit according to Embodiment 1 of the present invention.

FIGS. 15 and 16 are explanatory diagrams of an example of a frame buffered to the buffer unit 802 according to Embodiment 1 of the present invention.

Hereinafter, an example of the process executed when a frame illustrated in FIG. 15 or 16 is buffered to the buffer unit 802 will be described. First, the process of the readout timing control unit 804 in the case of FIGS. 15 and 16 will be described. Here, it is assumed that the key frame insertion interval G is set to 5 and the next readout frame sequence number is "100".

When it is determined in step 1105 in FIG. 11 that the present time point is larger than the next frame readout time point (YES), the flow proceeds to step 1106. In the case of FIGS. 15 and 16, since frames having a sequence number smaller than the next readout frame sequence number are not accumulated in the buffer, the process of step 1106 is not performed and the flow proceeds to step 1107. In step 1107, the computation result of "(next readout frame sequence number) mod (key frame insertion interval G)" is 100 mod 5=0, and the flow proceeds to step 1108. A determination result of YES is obtained in step 1108 and the flow proceeds to step 1110. Since a frame having a sequence number of 100 which is the next readout frame sequence number is accumulated in the buffer unit 802, a determination result of YES is obtained in step 1110 and the flow proceeds to step 1112. That is, in this example, since step 1111 is not executed, the key frame loss rate computing unit 806 does not receive the frame complete loss information. In step 1112, the frame group having a sequence number of "100" is copied and is input to the key frame loss rate computing unit 806.

Next, the process of the key frame loss rate computing unit 806 corresponding to the process of the readout timing control unit 804 will be described with reference to FIG. 12. Since it is determined in step 1201 that the frame complete loss information is not received from the readout timing control unit 804, the flow proceeds to step 1203. Since it is determined in step 1203 that the frame group is received from the readout timing control unit 804, the flow proceeds to step 1204.

<Process of Key Frame Loss Rate Computing Unit and Emergency Control Execution Determining Unit in Case of FIG. 15>

When a frame group (that is, composed of frames 1502, 1503, 1504, 1505, and 1506) illustrated in FIG. 15 is input to the key frame loss rate computing unit 806, the number of divisions 1507 of a header is referred to in step 1204 and M=5. As for N, since the input frame group includes five frames 1502, 1503, 1504, 1505, and 1506 in total, N=5. From this, (M−N)÷M=0÷5=0. In the example of FIG. 15, 0 is input to the emergency control execution determining unit 807 as the key frame loss rate.

It is assumed that 0.5 is set in the emergency control execution determining unit 807 as the key frame loss rate threshold. The emergency control execution determining unit 807 determines in step 1302 in FIG. 13 that the key frame loss rate is received (that is, YES), and the flow proceeds to step 1303. In step 1303, the emergency control execution determining unit 807 determines whether the key frame loss rate is larger than the key frame loss rate threshold. Here, since 0>0.5 and the conditional equation is not satisfied, a determination result of NO is obtained, and the flow proceeds to step 1302 and no notification is sent to the emergency control signal transmitting unit 808 (step 1304).

<Process of Key Frame Loss Rate Computing Unit and Emergency Control Execution Determining Unit in Case of FIG. 16>

When a frame group (that is, composed of frames 1602 and 1603) illustrated in FIG. 16 is input to the key frame loss rate computing unit 806, the number of divisions 1604 of a header is referred to in step 1204 and M=5. As for N, since the input frame group includes five frames 1602 and 1603 in total, N=2. From this, (M−N)÷M=3÷5=0.6. In the example of FIG. 16, 0.6 is input to the emergency control execution determining unit 807 as the key frame loss rate.

It is assumed that 0.5 is set in the emergency control execution determining unit 807 as the key frame loss rate threshold. The emergency control execution determining unit 807 determines in step 1302 in FIG. 13 that the key frame loss rate is received (that is, YES), and the flow proceeds to step 1303. In step 1303, the emergency control execution determining unit 807 determines whether the key frame loss rate is larger than the key frame loss rate threshold. Here, since 0.6>0.5 and the conditional equation is satisfied (that is, a determination result of YES is obtained), the flow proceeds to step 1304.

In step 1304, the emergency control execution determining unit 807 determines an emergency control method and notifies the emergency control signal transmitting unit 808 of the emergency control method, and an emergency control signal is transmitted from the emergency control signal transmitting unit 808 to the autonomous vehicle 101.

According to the present embodiment, in a system in which a vehicle moving by autonomous driving and a center (that is, a monitoring control server) are connected via a communication network and remote monitoring and control is performed, since emergency control which results in an increase in moving time is executed only when an image of the monitoring control server is disturbed due to a decrease in communication quality, it is possible to shorten the moving time while securing the safety of the vehicle.

Embodiment 21

Embodiment 2 of the present invention will be described with reference FIGS. 17 to 19. Since respective units of a system of Embodiment 2 have the same functions as respective units of Embodiment 1 illustrated in FIGS. 1 to 16, denoted by the same reference numerals as those of Embodiment 2 except for the difference to be described later, the description thereof will be omitted.

In the present embodiment, the configuration of the monitoring control server 105 is different from that of Embodiment 1.

Figure 17:
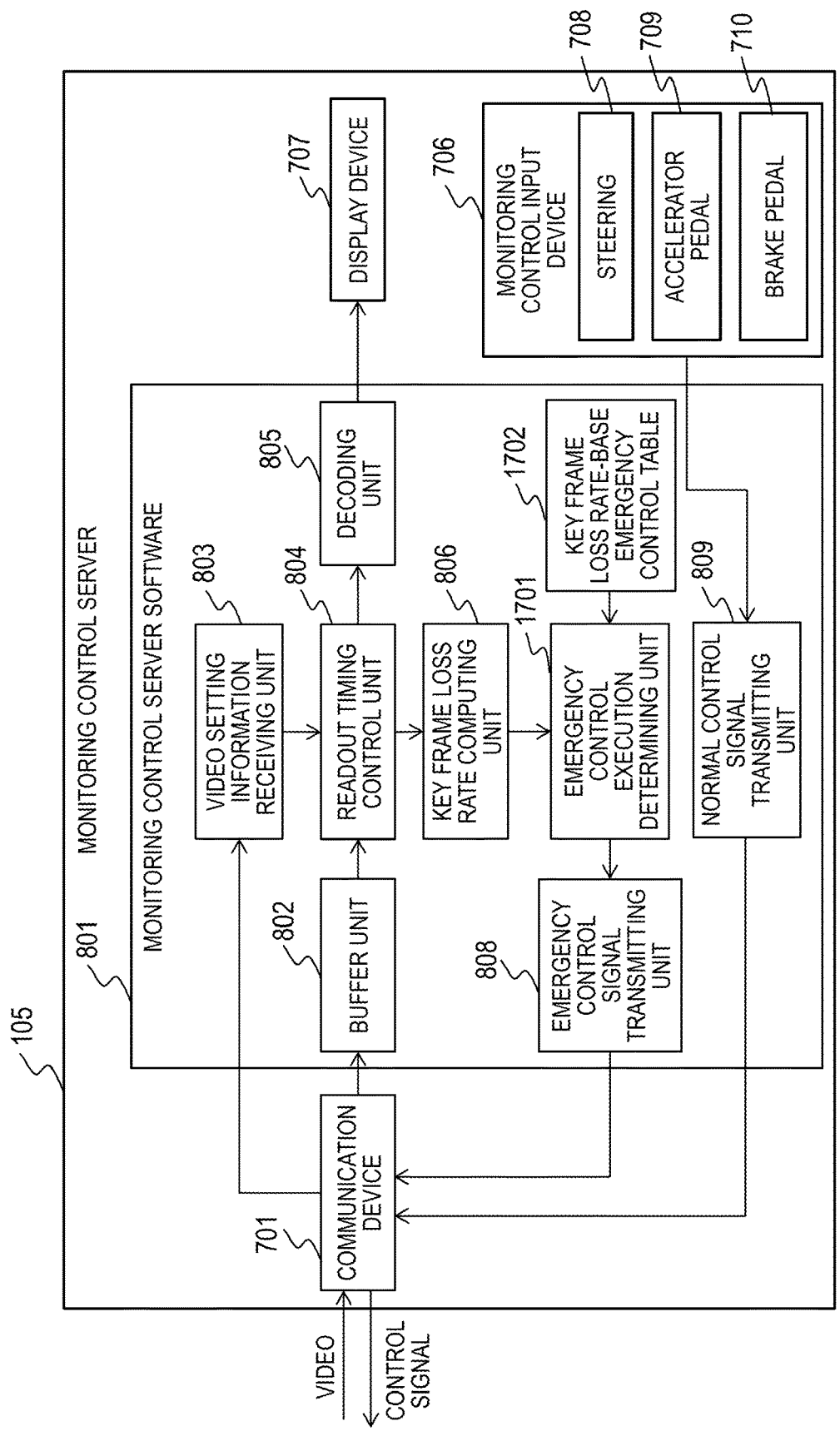
FIG. 17 is a block diagram illustrating a configuration of a monitoring control server according to Embodiment 2 of the present invention.

FIG. 17 is a block diagram illustrating a configuration of the monitoring control server 105 according to Embodiment 2 of the present invention.

Among constituent elements in FIG. 17, the same portions as those illustrated in FIG. 8 will be denoted by the same reference numerals as those of FIG. 8, and the description thereof will be omitted. The monitoring control server 105 in FIG. 17 has monitoring control server software 801. The monitoring control server software 801 of Embodiment 2 has an emergency control execution determining unit 1701 and a key frame loss rate-base emergency control table 1702 in addition to respective units similar to those of the monitoring control server software 801 of Embodiment 1. Upon receiving a key frame loss rate, the emergency control execution determining unit 1701 determines an emergency control method corresponding to the key frame loss rate by referring to the key frame loss rate-base emergency control table 1702 and notifies the emergency control signal transmitting unit 808 of the emergency control method. The key frame loss rate-base emergency control table 1702 is a table that stores the key frame loss rate and the emergency control method corresponding to the key frame loss rate in correlation.

Figures 18, 19:
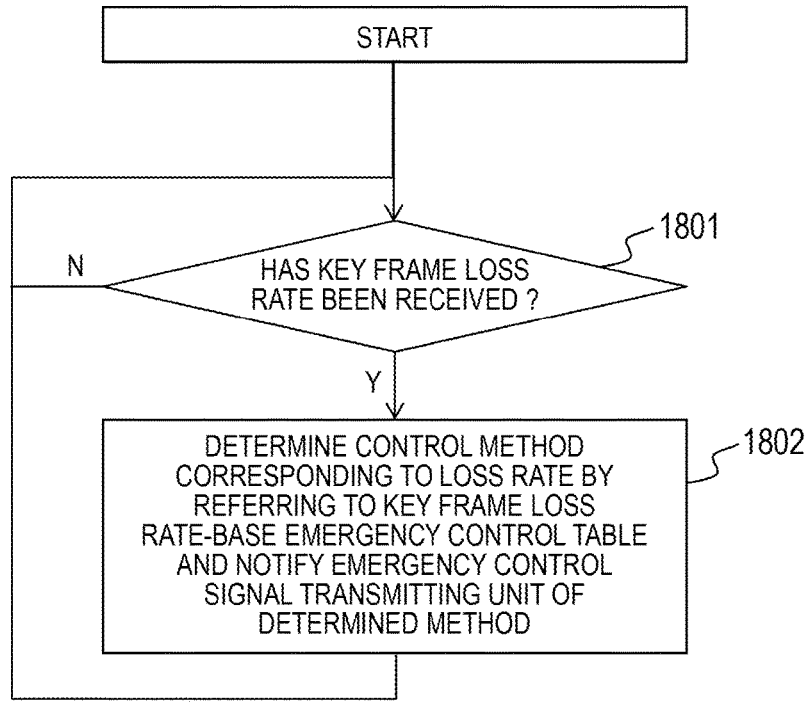
FIG. 18 is a flowchart illustrating the process of an emergency control execution determining unit according to Embodiment 2 of the present invention.
FIG. 19 is an explanatory diagram illustrating an example of a key frame loss rate-base emergency control table according to Embodiment 2 of the present invention.

FIG. 18 is a flowchart illustrating the process of the emergency control execution determining unit 1701 according to Embodiment 2 of the present invention.

When an operation starts, the emergency control execution determining unit 1701 determines whether a key frame loss rate is received (step 1801). When it is determined in step 1801 that the key frame loss rate is received, the flow proceeds to step 1802. When it is determined that step 1801 that the key frame loss rate is not received, the flow proceeds to step 1801. In step 1802, the emergency control execution determining unit 1701 determines an emergency control method corresponding to the key frame loss rate received in step 1801 by referring to the key frame loss rate-base emergency control table 1702 and notifies the emergency control signal transmitting unit 808 of the emergency control method.

FIG. 19 is an explanatory diagram illustrating an example of the key frame loss rate-base emergency control table 1702 according to Embodiment 2 of the present invention.

The key frame loss rate-base emergency control table 1702 includes a key frame loss rate 1901 and an emergency control method 1902. The emergency control execution determining unit 1701 refers to the key frame loss rate-base emergency control table 1702 in step 1802 and determines that emergency control is not to be executed (field 1906) when the key frame loss rate is 0 (field 1903). When the key frame loss rate 1901 is 0 to 0.5 (field 1904), "speed limiter control (restrict travel speed to 5 km/h or lower)" (field 1907) is executed as the emergency control method 1902. When the key frame loss rate 1901 is 0.5 to 1.0 (field 1905), "emergency stop" (field 1908) is executed as the emergency control method 1902.

In the example of FIGS. 18 and 19, when the key frame loss rate is not 0, it is estimated that the quality of an image generated and displayed on the basis of the received image data does not satisfy a requirement required for realizing safe remote-controlled driving (in other words, it is necessary to execute certain emergency control to secure safety of remote-controlled driving). Furthermore, it is determined that it is necessary to restrict the moving speed to 5 km/h or lower to secure safety of remote-controlled driving if the key frame loss rate is smaller than 0.5 and that it is necessary to execute emergency stop if the key frame loss rate exceeds 0.5

The emergency control method 1902 illustrated in FIG. 19 is set to three steps of no speed restriction, restrict the travel speed to 5 km/h or lower, and emergency stop. Here, "emergency stop" may be substituted with restriction of the travel speed to 0 km/h. That is, in the above example, the emergency control method is set such that the higher the key frame loss rate, the stricter the speed restriction (that is, the lower the travel speed is restricted to). Furthermore, the speed restriction may be subdivided more finely to increase the number of steps of speed restriction such that the higher the key frame loss rate, the stricter the speed restriction. Since the degree of deterioration of the quality of an image output by the monitoring control server 105 increases as the key frame loss rate increases, stricter speed restriction is required to secure safety.

According to the present embodiment, in a system in which a vehicle moving by autonomous driving and a center are connected via a communication network and remote monitoring and control is performed, since minimally necessary emergency control corresponding to the key frame loss rate is executed, it is possible to further shorten the moving time while securing the vehicle safety.

Embodiment 3

Embodiment 3 according to the present invention will be described with reference to FIGS. 20 to 22. Since respective units of a system of Embodiment 3 have the same functions as respective units of Embodiments 1 and 2 illustrated in FIGS. 1 to 19, denoted by the same reference numerals as those of Embodiments 1 and 2 except for the difference to be described later, the description thereof will be omitted.

In the present embodiment, the configuration of the monitoring control server 105 is different from that of Embodiment 1.

Figure 20:
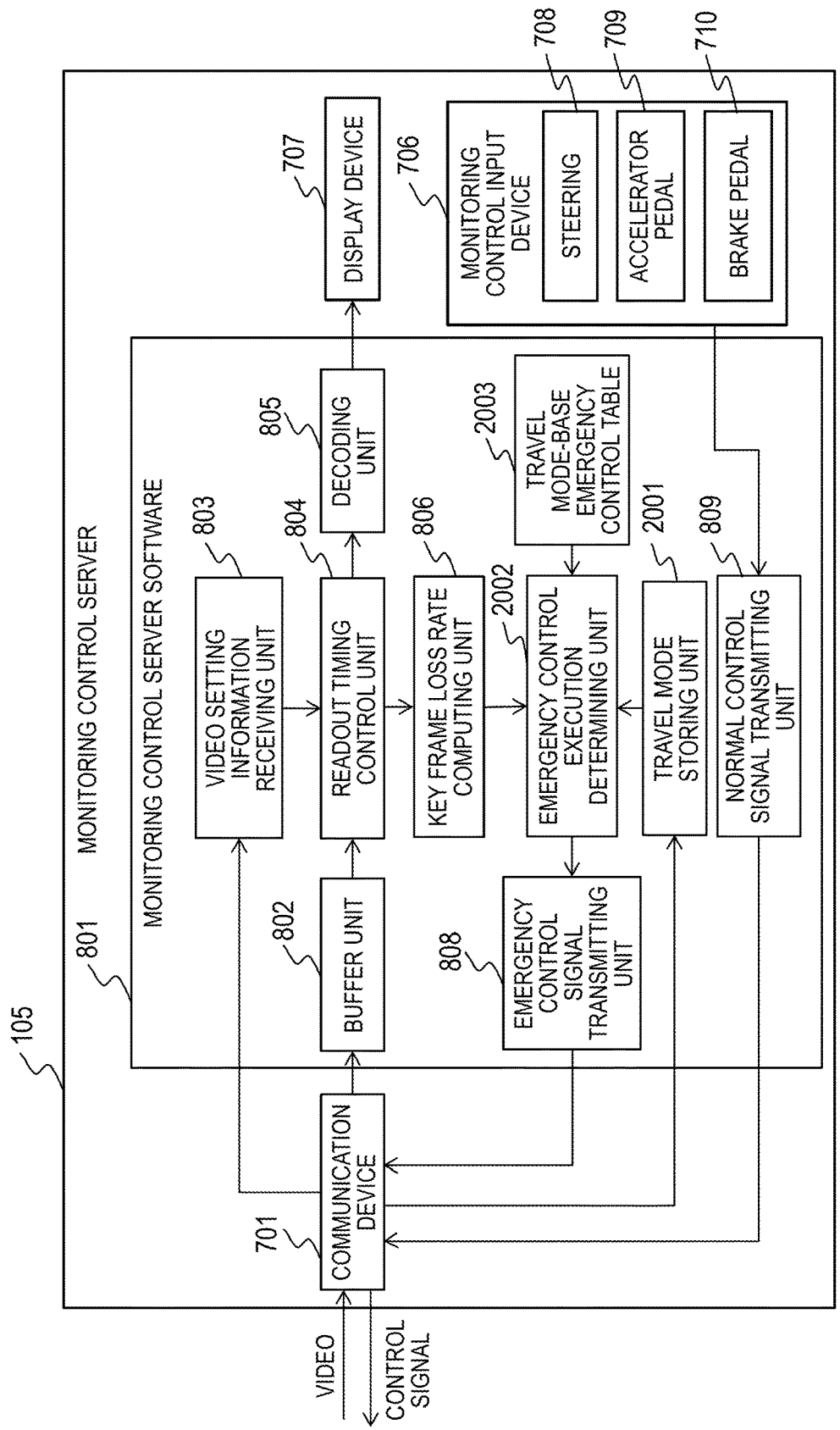
FIG. 20 is a block diagram illustrating a configuration of a monitoring control server according to Embodiment 3 of the present invention.

FIG. 20 is a block diagram illustrating a configuration of the monitoring control server 105 according to Embodiment 3 of the present invention.

Among constituent elements in FIG. 20, the same portions as those illustrated in FIG. 8 will be denoted by the same reference numerals as those of FIG. 8, and the description thereof will be omitted. The monitoring control server 105 in FIG. 20 has monitoring control server software 801. The monitoring control server software 801 of Embodiment 3 has a travel mode storing unit 2001, an emergency control execution determining unit 2002, and a travel mode-base emergency control table 2003 in addition to respective units similar to those of the monitoring control server software 801 of Embodiment 1.

The travel mode storing unit 2001 receives the travel mode of the autonomous vehicle 101 transmitted by the autonomous vehicle 101 via the communication device 701 and stores the same therein. The emergency control execution determining unit 2002 determines an emergency control method corresponding to the key frame loss rate input from the key frame loss rate computing unit 806 and the travel mode of the autonomous vehicle 101 stored in the travel mode storing unit 2001 by referring to the travel mode-base emergency control table 2003. The travel mode-base emergency control table 2003 is a table that records the travel mode of the autonomous vehicle 101 and the emergency control method in correlation.

Figures 21, 22:
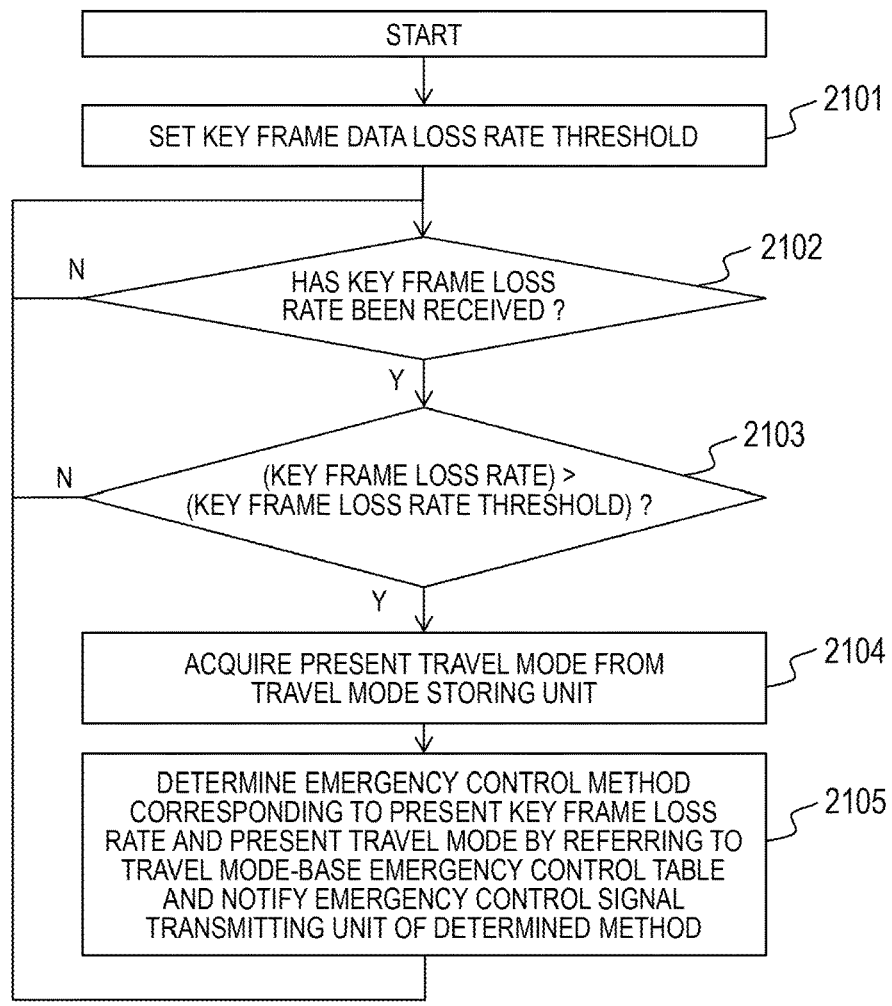
FIG. 21 is a flowchart illustrating the process of an emergency control execution determining unit according to Embodiment 3 of the present invention.
FIG. 22 is an explanatory diagram illustrating an example of a travel mode-base emergency control table according to Embodiment 3 of the present invention.

FIG. 21 is a flowchart illustrating the process of the emergency control execution determining unit 2002 according to Embodiment 3 of the present invention.

When an operation starts, the emergency control execution determining unit 2002 sets a key frame loss rate threshold (step 2101). Subsequently, in step 2102, the emergency control execution determining unit 2002 determines whether a key frame loss rate is received. When it is determined in step 2102 that the key frame loss rate is received, the flow proceeds to step 2103. When it is determined in step 2102 that the key frame loss rate is not received, the flow proceeds to step 2102.

In step 2103, the emergency control execution determining unit 2002 determines whether the key frame loss rate is larger than the key frame loss rate threshold. When it is determined in step 2103 that the key frame loss rate is larger than key frame loss rate threshold, the flow proceeds to step 2104. When it is determined in step 2103 that the key frame loss rate is not larger than the key frame loss rate threshold, the flow proceeds to step 2102. In step 2104, the emergency control execution determining unit 2002 acquires a present travel mode from the travel mode storing unit 2001 and the flow proceeds to step 2105. In step 2105, the emergency control execution determining unit 2002 determines an emergency control method corresponding to a present key frame loss rate and the present travel mode by referring to the travel mode-base emergency control table 2003 and notifies the emergency control signal transmitting unit 808 of the emergency control method.

FIG. 22 is an explanatory diagram illustrating an example of the travel mode-base emergency control table 2003 according to Embodiment 3 of the present invention.

The travel mode-base emergency control table 2003 includes a travel mode 2201 and an emergency control method 2202. The emergency control execution determining unit 2002 executes speed limiter control (restrict travel speed to 5 km/h or lower) (field 2205) as the emergency control method 2202 when it is determined in step 2103 that the key frame loss rate is larger than the key frame loss rate threshold and the travel mode 2201 is automated driving (field 2203). Emergency stop (field 2206) is executed as the emergency control method 2202 when the travel mode 2201 is remote-controlled driving (field 2204).

Since the quality of the image output by the monitoring control server 105 has a large influence on the safety of travelling when the autonomous vehicle 101 executes remote-controlled driving, it is necessary to execute emergency control such as restriction of the travel speed to secure safety when the image quality decreases due to an increase or the like in the key frame loss rate. On the other hand, although it is less necessary to execute emergency control since the quality of the image output by the monitoring control server 105 has an immediate influence on safety when the autonomous vehicle 101 execute automated driving, it is preferable to execute control to a certain extent since there is a possibility that the autonomous vehicle 101 enters into a remote-controlled driving mode. Due to this, the emergency control method is set such that in the above example, when the key frame loss rate satisfies a predetermined condition, the travel speed during the automated driving is restricted to be lower than that during the automated driving.

According to the present embodiment, in a system in which a vehicle moving by autonomous driving and a center are connected via a communication network and remote monitoring and control is performed, since minimally necessary emergency control corresponding to the travel mode is executed, it is possible to further shorten the moving time while securing the vehicle safety.

Embodiment 4

Embodiment 4 according to the present invention will be described with reference to FIGS. 23 to 25. Since respective units of a system of Embodiment 4 have the same functions as respective units of Embodiments 1 to 3 illustrated in FIGS. 1 to 22, denoted by the same reference numerals as those of Embodiments 1 to 3 except for the difference to be described later, the description thereof will be omitted.

In the present embodiment, the configuration of the monitoring control server 105 is different from that of Embodiment 1.

Figure 23:
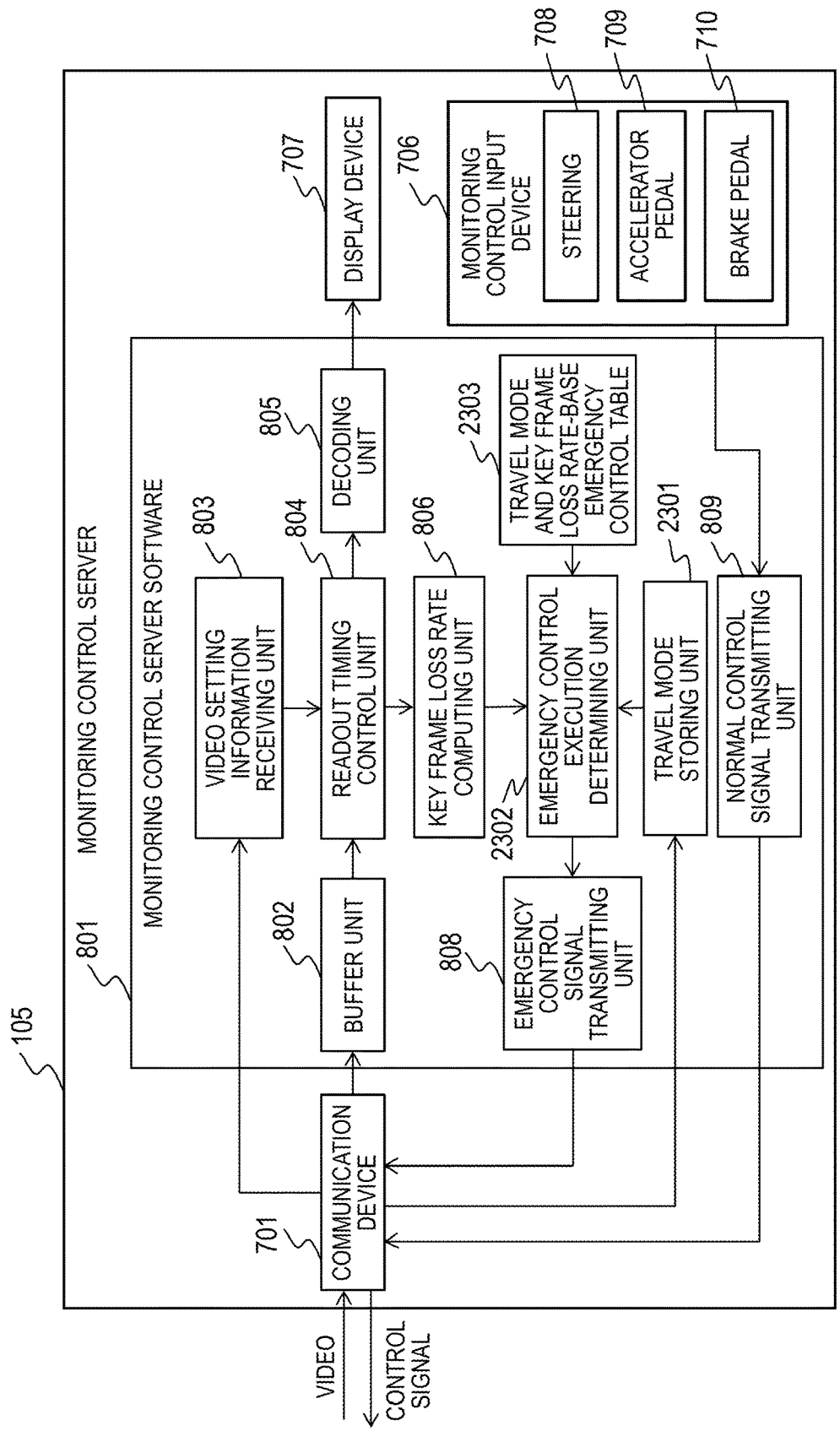
FIG. 23 is a block diagram illustrating a configuration of a monitoring control server according to Embodiment 4 of the present invention.

FIG. 23 is a block diagram illustrating a configuration of the monitoring control server 105 according to Embodiment 4 of the present invention.

Among constituent elements in FIG. 23, the same portions as those illustrated in FIG. 8 will be denoted by the same reference numerals as those of FIG. 8, and the description thereof will be omitted. The monitoring control server 105 in FIG. 23 has monitoring control server software 801. The monitoring control server software 801 has a travel mode storing unit 2301, an emergency control execution determining unit 2302, and a travel mode and key frame loss rate-base emergency control table 2303 in addition to respective units similar to those of the monitoring control server software 801 of Embodiment 1.

The travel mode storing unit 2301 receives the travel mode of the autonomous vehicle 101 transmitted by the autonomous vehicle 101 via the communication device 701 and stores the travel mode therein. The emergency control execution determining unit 2302 determines an emergency control method corresponding to the key frame loss rate input from the key frame loss rate computing unit 806 and the travel mode of the autonomous vehicle 101 stored in the travel mode storing unit 2301 by referring to a travel mode and key frame loss rate-base emergency control table 2303. The travel mode and key frame loss rate-base emergency control table 2303 is a table that records the travel mode of the autonomous vehicle 101, the key frame loss rate, and the emergency control method in correlation.

FIG. 24 is a flowchart illustrating the process of the emergency control execution determining unit 2302 according to Embodiment 4 of the present invention.

When an operation starts, the emergency control execution determining unit 2302 determines whether the key frame loss rate is received (step 2401). When it is determined in step 2401 that the key frame loss rate is received, the flow proceeds to step 2402. When it is determined in step 2401 that the key frame loss rate is not received, the flow proceeds to step 2401.

In step 2402, the emergency control execution determining unit 2302 acquires the present travel mode from the travel mode storing unit 2301 and the flow proceeds to step 2403. In step 2403, the emergency control execution determining unit 2302 determines an emergency control method corresponding to the received key frame loss rate and the travel mode by referring to the travel mode and key frame loss rate-base emergency control table 2303 and notifies the emergency control signal transmitting unit 808 of the emergency control method.

FIG. 25 is an explanatory diagram illustrating an example of the travel mode and key frame loss rate-base emergency control table 2303 according to Embodiment 4 of the present invention.

The travel mode and key frame loss rate-base emergency control table 2303 includes a travel mode 2501, a key frame loss rate 2502, and an emergency control method 2503. The emergency control execution determining unit 2302 refers to the travel mode and key frame loss rate-base emergency control table in step 2403 in FIG. 24 and determines that emergency control is not to be executed when the travel mode 2501 is "automated driving" and the key frame loss rate is 0. When the travel mode is "automated driving" and the key frame loss rate is 0 to 0.5, it is determined that "speed limiter control (restriction of travel speed to 10 km/h)" (2503) is to be executed as the emergency control method. When the travel mode is "automated driving" and the key frame loss rate is 0.5 to 1.0, it is determined that "speed limiter control (restriction of travel speed to 5 km/h)" is to be executed as the emergency control method. When the travel mode is "remote-controlled driving" and the key frame loss rate is 0, it is determined that emergency control is not to be executed. When the travel mode is "remote-controlled driving" and the key frame loss rate is 0 to 0.5, it is determined that "speed limiter control (restriction of travel speed to 5 km/h)" is to be executed as the emergency control method. When the travel mode is "remote-controlled driving" and the key frame loss rate is 0.5 to 1.0, it is determined that "emergency stop" is to be executed as the emergency control method. In this manner, in the present embodiment, the travel mode, the key frame loss rate, and the emergency control method are correlated such that the travel speed during the automated driving is restricted to be lower than that during the remote-controlled driving, and the higher the key frame loss rate, the lower the travel speed is restricted to.

According to the present embodiment, in a system in which a vehicle moving by autonomous driving and a center are connected via a communication network and remote monitoring and control is performed, since minimally necessary emergency control corresponding to the travel mode and the key frame loss rate is executed, it is possible to further shorten the moving time while securing the vehicle safety.

Embodiment 5

Embodiment 5 according to the present invention will be described with reference to FIGS. 26 to 32. Since respective units of a system of Embodiment 5 have the same functions as respective units of Embodiments 1 to 4 illustrated in FIGS. 1 to 25, denoted by the same reference numerals as those of Embodiments 1 to 4 except for the difference to be described later, the description thereof will be omitted.

In the present embodiment, the configuration of the monitoring control server 105 is different from that of Embodiment 1.

Figure 26:
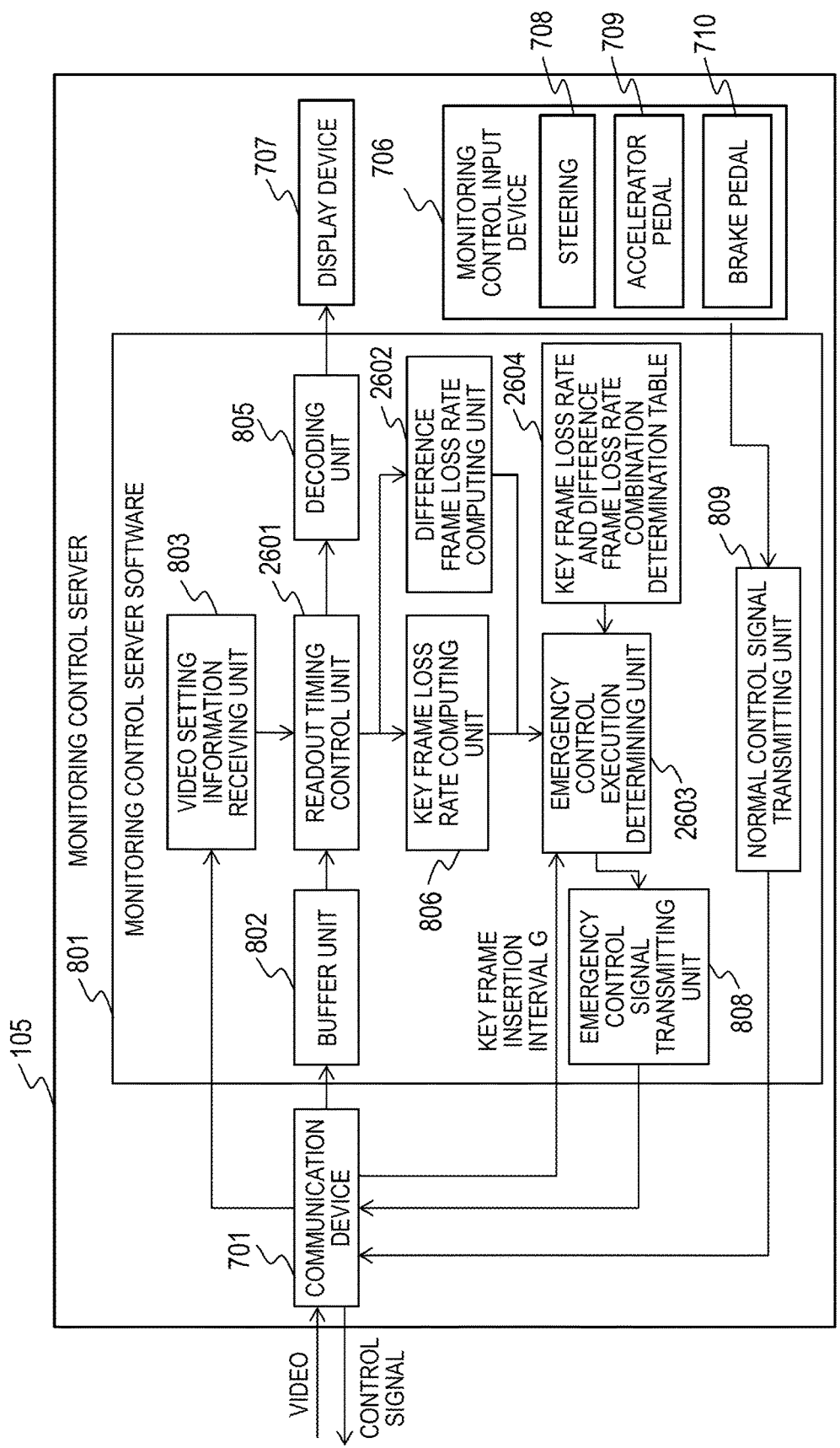
FIG. 26 is a block diagram illustrating a configuration of a monitoring control server according to Embodiment 5 of the present invention.

FIG. 26 is a block diagram illustrating a configuration of the monitoring control server 105 according to Embodiment 5 of the present invention.

Among constituent elements in FIG. 26, the same portions as those illustrated in FIG. 8 will be denoted by the same reference numerals as those of FIG. 8, and the description thereof will be omitted. The monitoring control server 105 in FIG. 26 has monitoring control server software 801. The monitoring control server software 801 of Embodiment 5 has a readout timing control unit 2601, a difference frame loss rate computing unit 2602, an emergency control execution determining unit 2603, and a key frame loss rate and difference frame loss rate combination determination table 2604 in addition to respective units similar to those of the monitoring control server software 801 of Embodiment 1.

The readout timing control unit 2601 reads a frame from the buffer unit 802 and inputs the same to the decoding unit 805 such that the frame is input to the key frame loss rate computing unit 806 if the frame is a key frame, and the frame is input to the difference frame loss rate computing unit 2602 if the frame is a difference frame. When a difference frame is input from the readout timing control unit 2601, the difference frame loss rate computing unit 2602 computes a difference frame loss rate and inputs the same to the emergency control execution determining unit 2603.

The emergency control execution determining unit 2603 determines an emergency control method when the key frame loss rate and the difference frame loss rate satisfy any one of determination conditions of the key frame loss rate and difference frame loss rate combination determination table 2604 by referring to the key frame loss rate and difference frame loss rate combination determination table 2604 and notifies the emergency control signal transmitting unit 808 of the emergency control method. The key frame loss rate and difference frame loss rate combination determination table 2604 is a table that records one or a plurality of determination conditions for a combination of the key frame loss rate and the difference frame loss rate.

Figure 27:
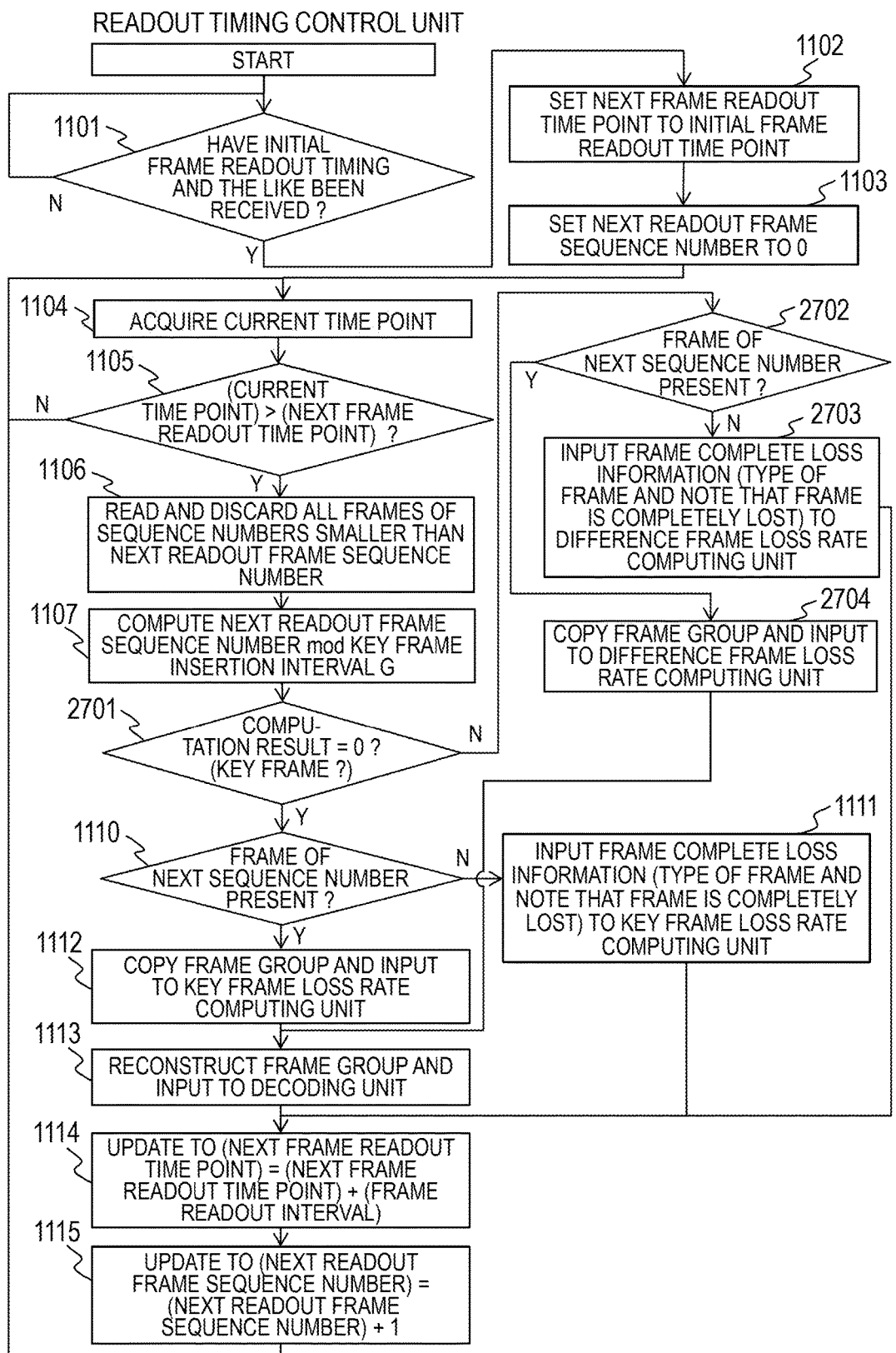
FIG. 27 is a flowchart illustrating the process of a readout timing control unit according to Embodiment 5 of the present invention.

FIG. 27 is a flowchart illustrating the process of the readout timing control unit 2601 according to Embodiment 5 of the present invention.

The same portions as those illustrated in FIG. 11 will be denoted by the same reference numerals as those of FIG. 11, and the description thereof will be omitted.

In step 2701, the readout timing control unit 2601 determines whether the computation result is 0 (that is, the next readout frame is a key frame). When it is determined in step 2701 that the computation result is 0 (that is, the next readout frame is a key frame), the flow proceeds to step 1110. When it is determined in step 2701 that the computation result is not 0 (that is, the next readout frame is not a key frame but a difference frame), the flow proceeds to step 2702.

In step 2702, the readout timing control unit 2601 determines whether a frame of a next readout frame sequence number is present. When it is determined in step 2702 that a frame of the next readout frame sequence number is present, the flow proceeds to step 2704. When it is determined in step 2702 that a frame of the next readout frame sequence number is not present (that is, the difference frame is lost), the flow proceeds to step 2703. In step 2703, the readout timing control unit 2601 inputs frame complete loss information (information indicating that the type of the frame is a difference frame and the frame is completely lost) to the difference frame loss rate computing unit 2602 and the flow proceeds to step 1114. In step 2704, the readout timing control unit 2601 copies the frame group of the next readout frame sequence number and inputs the same to the difference frame loss rate computing unit 2602.

Figure 28:
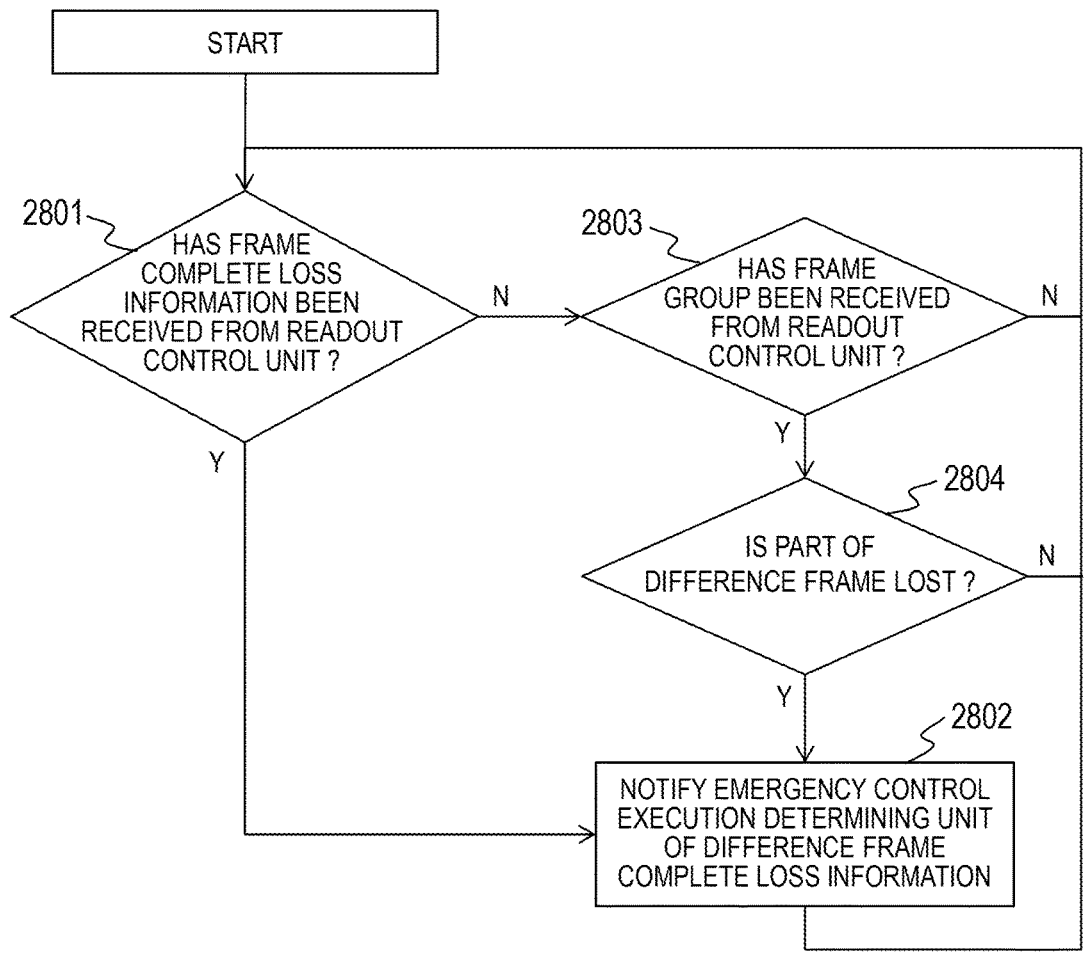
FIG. 28 is a flowchart illustrating the process of a difference frame loss rate computing unit according to Embodiment 5 of the present invention.

FIG. 28 is a flowchart illustrating the process of the difference frame loss rate computing unit 2602 according to Embodiment 5 of the present invention.

When an operation starts, the difference frame loss rate computing unit 2602 determines whether the frame complete loss information is received from the readout timing control unit 2601 (step 2801). When it is determined in step 2801 that the frame complete loss information is received, the flow proceeds to step 2802. When it is determined in step 2801 that the frame complete loss information is not received, the flow proceeds to step 2803.

In step 2802, the difference frame loss rate computing unit 2602 notifies the emergency control execution determining unit 807 of the difference frame loss rate being 1. In step 2803, the difference frame loss rate computing unit 2602 determines whether a frame group is received from the readout timing control unit 2601. When it is determined in step 2803 that the frame group is received, the flow proceeds to step 2804. When it is determined in step 2803 that the frame group is not received, the flow proceeds to step 2801.

In step 2804, the difference frame loss rate computing unit 2602 determines whether a part of the difference frame is lost. When it is determined in step 2804 that a part of the difference frame is lost, the flow proceeds to step 2802. When it is determined in step 2804 that a part of the difference frame is not lost, the flow proceeds to step 2801.

Figure 29:
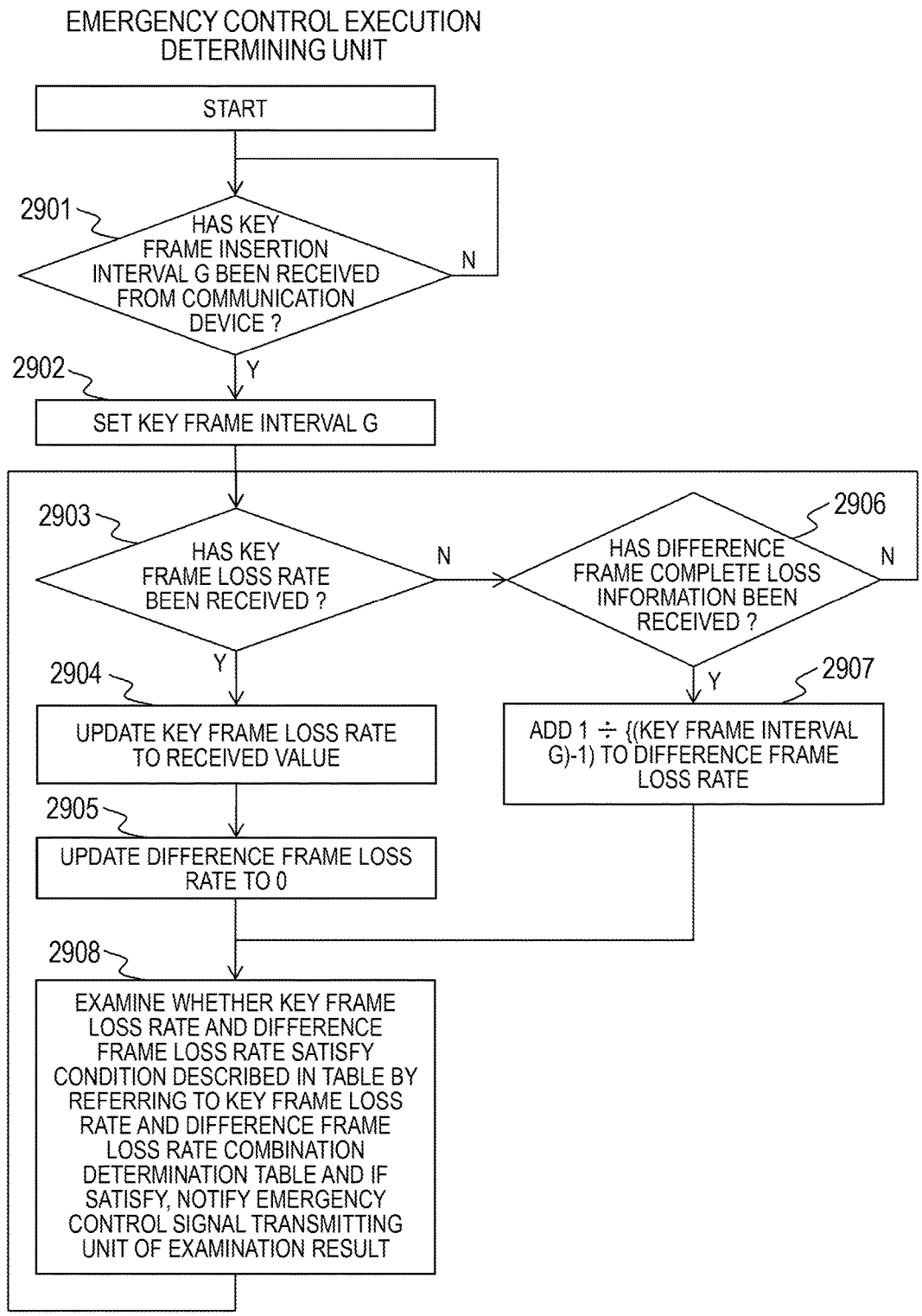
FIG. 29 is a flowchart illustrating the process of an emergency control execution determining unit according to Embodiment 5 of the present invention.

FIG. 29 is a flowchart illustrating the process of the emergency control execution determining unit 2603 according to Embodiment 5 of the present invention.

When an operation starts, the emergency control execution determining unit 2603 determines whether the key frame insertion interval G is received from the communication device 701 (step 2901). When it is determined in step 2901 that the key frame insertion interval G is received from the communication device 701, the flow proceeds to step 2902. When it is determined in step 2901 that the key frame insertion interval G is not received from the communication device 701, the flow proceeds to step 2901.

In step 2902, the emergency control execution determining unit 2603 sets the key frame interval G to the received value and the flow proceeds to step 2903. In step 2903, the emergency control execution determining unit 2603 determines whether the key frame loss rate is received. When it is determined in step 2903 that the key frame loss rate is received, the flow proceeds to step 2904. When it is determined in step 2903 that the key frame loss rate is not received, the flow proceeds to step 2906.

In step 2904, the emergency control execution determining unit 2603 updates the key frame loss rate to the received value and the flow proceeds to step 2905. In step 2905, the emergency control execution determining unit 2603 updates the difference frame loss rate to 0 and the flow proceeds to step 2908. In step 2906, the emergency control execution determining unit 2603 determines whether difference frame complete loss information is received. When it is determined in step 2906 that the difference frame complete loss information is received, the flow proceeds to step 2907. When it is determined in step 2906 that the difference frame complete loss information is not received, the flow proceeds to step 2903.

In step 2907, the emergency control execution determining unit 2603 adds "1÷((key frame interval G)−1)" to the difference frame loss rate and the flow proceeds to step 2908. In step 2908, the emergency control execution determining unit 2603 examines whether the computed key frame loss rate and the difference frame loss rate satisfy the condition described in the table by referring to the key frame loss rate and difference frame loss rate combination determination table 2604 and notifies the emergency control signal transmitting unit 808 of the examination result, and the flow proceeds to step 2903.

Figure 30:
FIG. 30 is an explanatory diagram illustrating an example of a key frame loss rate and difference frame loss rate combination determination table according to Embodiment 5 of the present invention.

FIG. 30 is an explanatory diagram illustrating an example of the key frame loss rate and difference frame loss rate combination determination table 2604 according to Embodiment 5 of the present invention.

The key frame loss rate and difference frame loss rate combination determination table 2604 is composed of a combination of the key frame loss rate 3002 and the difference frame loss rate 3003. Combinations of the value L of the key frame loss rate 3002 and the value M of the difference frame loss rate 3003 are determination conditions referred to in step 2908, and the determination condition 3001 is a number (any one of 1 to 3 in the example of FIG. 30) for identifying the respective determination conditions. In the following description, a determination condition of which the determination condition 3001 is 1 is also referred to as determination condition 1. The same is true for the other values of the determination condition 3001.

In the example of FIG. 30, determination condition 1 is satisfied if the difference frame loss rate M is 0.75 or larger even when the key frame loss rate L is 0. The fact that any one of determination conditions 1 to 3 is satisfied means that it is estimated that the quality of an image generated and displayed on the basis of the received image data does not satisfy a requirement required for realizing safe remote-controlled driving (in other words, it is necessary to execute certain emergency control to secure safety of remote-controlled driving). Due to this, a predetermined emergency control signal is transmitted. When the key frame loss rate L satisfies 0<L≤0.4 and the difference frame loss rate M is 0.50 or larger, since determination condition 2 is satisfied, a predetermined emergency control signal is transmitted. When the key frame loss rate L is larger than 0.4 and the difference frame loss rate M is 0.25 or larger, since determination condition 3 is satisfied, a predetermined emergency control signal is transmitted. In this manner, a threshold (in the above example, 0.75, 0.50, and 0.25) of the difference frame loss rate M is set such that the larger the key frame loss rate L, the smaller the threshold, and emergency control is executed when the difference frame loss rate M is equal to or larger than the threshold. That is, emergency control is executed if the difference frame loss rate M is sufficiently larger even when the key frame loss rate L is small, and emergency control is executed if the key frame loss rate L is sufficiently large even when the difference frame loss rate M is small. While an example has been described, by appropriately setting the relationship between the range of the key frame loss rate L and the threshold of the difference frame loss rate M, it is possible to execute emergency control minimally necessary for securing safety.

An example of a specific process of the emergency control execution determining unit 2603 will be described with reference to FIGS. 31 and 32.

Here, it is assumed that a table illustrated in FIG. 30 is used as the key frame loss rate and difference frame loss rate combination determination table 2604.

Figure 31:
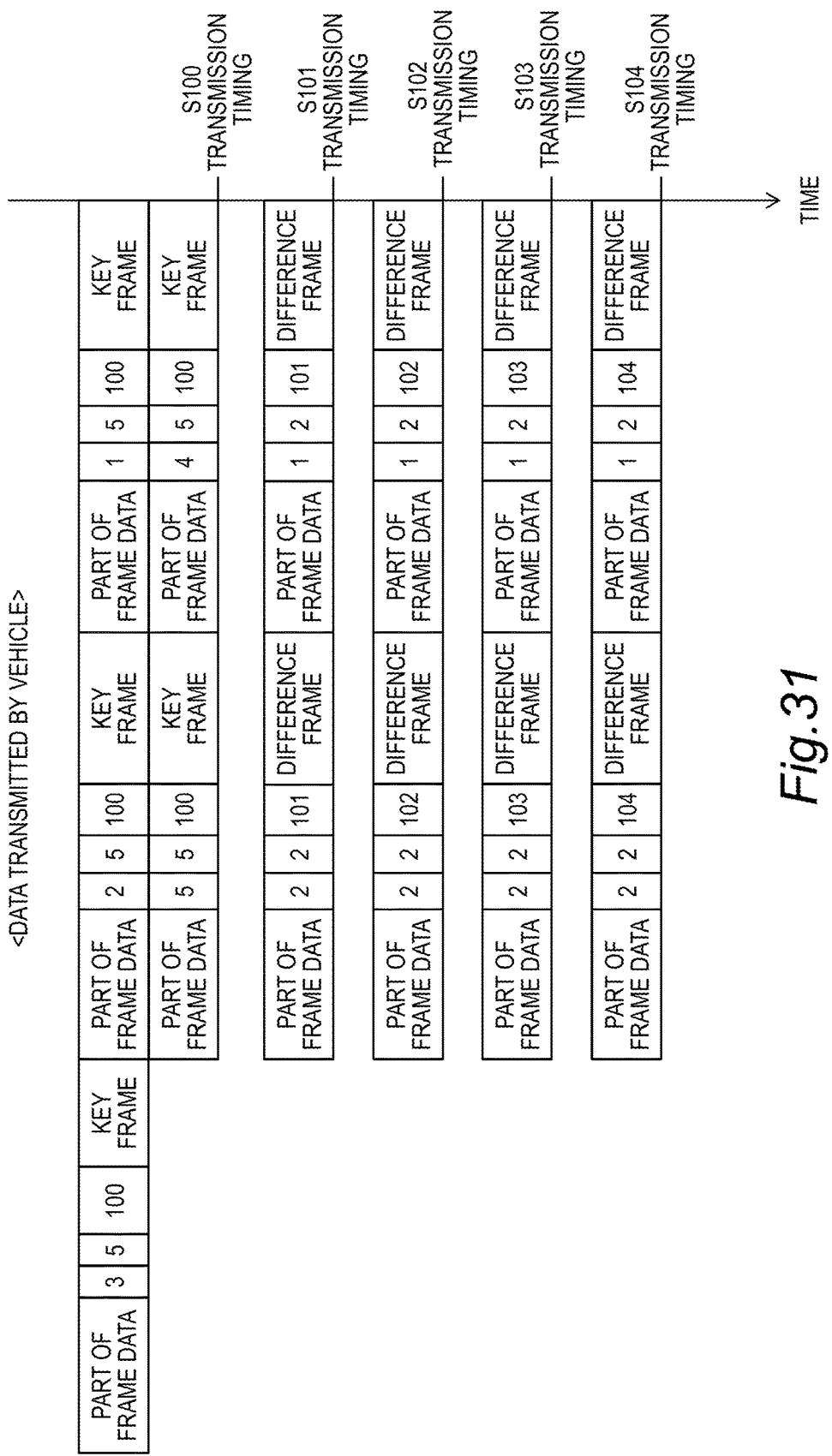
FIG. 31 is an explanatory diagram illustrating an example of a frame transmission timing of an autonomous vehicle according to Embodiment 5 of the present invention.

FIG. 31 is an explanatory diagram illustrating a table form of the autonomous vehicle 101 according to Embodiment 5 of the present invention.

Figure 32:
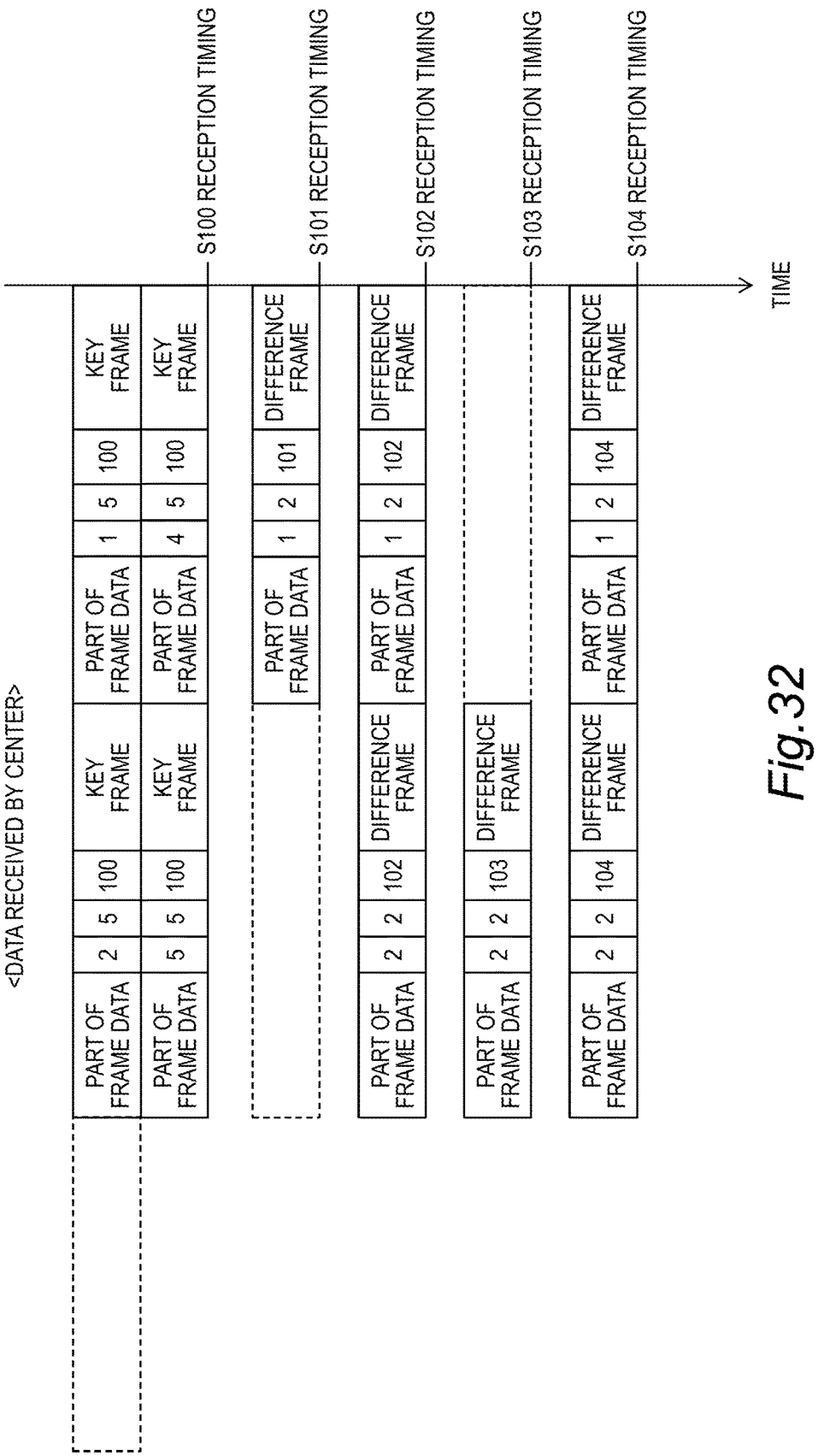
FIG. 32 is an explanatory diagram illustrating an example of a frame reception timing of a monitoring control server according to Embodiment 5 of the present invention.

FIG. 32 is an explanatory diagram illustrating an example of a frame reception timing of the monitoring control server 105 according to Embodiment 5 of the present invention.

In the example of FIGS. 31 and 32, it is assumed that the key frame interval G is 5. That is, a key frame is generated and transmitted at an interval of every five frames. As illustrated in FIG. 31, the autonomous vehicle 101 transmits a key frame having a sequence number of 100 at transmission timing S100. In this example, the key frame having the sequence number of 100 is transmitted by being divided into five communication packets having serial numbers of 1 to 5. Furthermore, the autonomous vehicle 101 transmits difference frames having sequence numbers of 101, 102, 103, and 104 at transmission timings S101, S102, S103, and S104, respectively. In this example, each of the difference frames is transmitted by being divided into two communication packets having serial numbers of 1 and 2.

As illustrated in FIG. 32, the monitoring control server 105 receives and reads the respective frames transmitted by the autonomous vehicle 101. Specifically, the monitoring control server 105 reads the key frame having the sequence number of 100 at readout timing R100. Furthermore, the monitoring control server 105 reads the difference frames having the sequence numbers of 101, 102, 103, and 104 at readout timings R101, R102, R103, and R104, respectively. The computation process of the key frame loss rate computing unit 806 and the difference frame loss rate computing unit 2602 at the respective readout timings in FIG. 32 will be described below.

In the example of FIG. 32, the monitoring control server 105 has not received the communication packet having the serial number of 3 among the five communication packets in which a part of the key frame having the sequence number of 100 is stored at readout timing R100. Moreover, the monitoring control server 105 has not received the communication packet having the serial number of 2 among the two communication packets in which a part of the difference frame having the sequence number of 101 is stored at readout timing R101. Furthermore, the monitoring control server 105 has not received the communication packet having the serial number of 1 among the two communication packets in which a part of the difference frame having the sequence number of 103 is stored at readout timing R103.

At readout timing R100, the key frame loss rate computing unit 806 computes (key frame loss rate)=(5−4)/5=0.2 in step 1204 in FIG. 12. The emergency control execution determining unit 2603 updates the difference frame loss rate to 0 in step 2905 in FIG. 29. In step 2908, since the present key frame loss rate of 0.2 and the difference frame loss of 0 do not correspond to any one of the determination conditions 3001 in the key frame loss rate and difference frame loss rate combination determination table 2604, the emergency control execution determining unit 2603 determines that emergency control is not to be executed.

Subsequently, at readout timing R101, the difference frame loss rate computing unit 2602 determines that a part of the difference frame is lost in step 2804 in FIG. 28 and the flow proceeds to step 2802. In step 2802, the difference frame loss rate computing unit 2602 notifies the emergency control execution determining unit 2603 of the difference frame complete loss information. Since the emergency control execution determining unit 2603 has determined in step 2906 that the difference frame complete loss information is received, the flow proceeds to step 2907. In step 2907, the emergency control execution determining unit 2603 adds "1÷(5−1)=0.25" to the present difference frame loss rate of 0 to update the present difference frame loss rate to 0.25. In step 2908, since the present key frame loss rate of 0.2 and the difference frame loss of 0.25 do not correspond to any one of the determination conditions 3001 of the key frame loss rate and difference frame loss rate combination determination table 2604, the emergency control execution determining unit 2603 determines that emergency control is not to be executed.

Subsequently, at readout timing R102, the difference frame loss rate computing unit 2602 determines that a part of the difference frame is not lost in step 2804 in FIG. 28, and the flow proceeds to step 2801, and no notification is sent to the emergency control execution determining unit 2603.

Subsequently, at readout timing R103, the difference frame loss rate computing unit 2602 determines that a part of the difference frame is lost in step 2804, and the flow proceeds to step 2802. In step 2802, the difference frame loss rate computing unit 2602 notifies the emergency control execution determining unit 2603 of the difference frame complete loss information. Since the emergency control execution determining unit 2603 has determined in step 2906 that the difference frame complete loss information is received, the flow proceeds to step 2907. In step 2907, the emergency control execution determining unit 2603 adds "1÷(5−1)=0.25" to the present difference frame loss rate of 0.25 to update the present difference frame loss rate to 0.5. In step 2908, the present key frame loss rate is 0.2 and the difference frame loss is 0.5. Since these values correspond to the determination condition of which the determination condition 3001 is 2 registered in the key frame loss rate and difference frame loss rate combination determination table 2604, the emergency control execution determining unit 2603 determines that emergency control is to be executed.

According to the present embodiment, in a system in which a vehicle moving by autonomous driving and a center are connected via a communication network and remote monitoring and control is performed, since minimally necessary emergency control corresponding to the key frame loss rate and the difference frame loss rate is executed, it is possible to further shorten the moving time while securing the vehicle safety.

Embodiment 6

Embodiment 6 according to the present invention will be described with reference to FIGS. 33 to 35. Since respective units of a system of Embodiment 6 have the same functions as respective units of Embodiments 1 to 5 illustrated in FIGS. 1 to 32, denoted by the same reference numerals as those of Embodiments 1 to 5 except for the difference to be described later, the description thereof will be omitted.

In the present embodiment, the configuration of the monitoring control server 105 is different from that of Embodiment 5.

Figure 33:
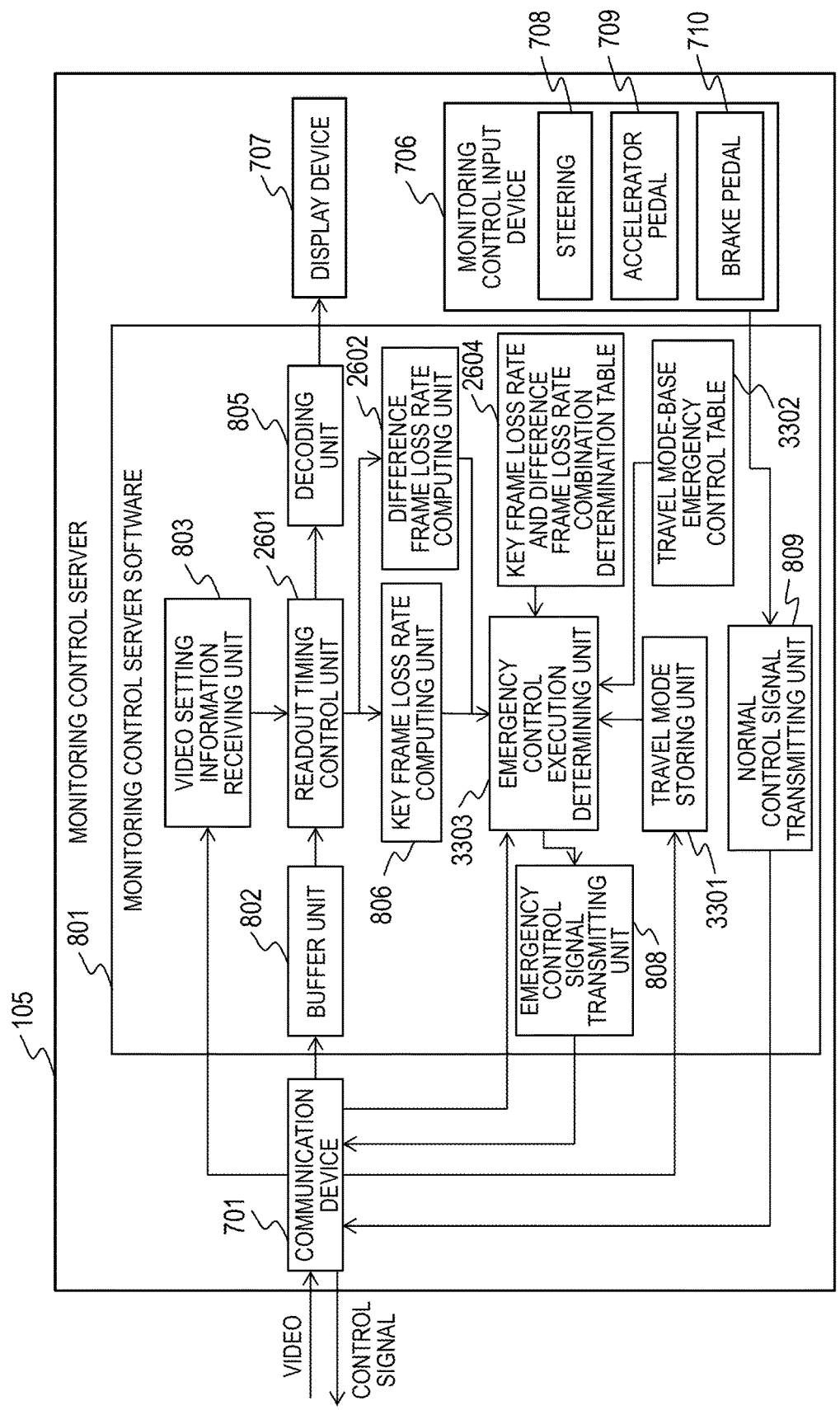
FIG. 33 is a block diagram illustrating a configuration of a monitoring control server according to Embodiment 6 of the present invention.

FIG. 33 is a block diagram illustrating a configuration of the monitoring control server 105 according to Embodiment 6 of the present invention.

Among constituent elements in FIG. 33, the same portions as those illustrated in FIG. 26 will be denoted by the same reference numerals as those of FIG. 26, and the description thereof will be omitted. The monitoring control server 105 in FIG. 33 has monitoring control server software 801. The monitoring control server software 801 has a travel mode storing unit 3301, a travel mode-base emergency control table 3302, and an emergency control execution determining unit 3303 in addition to respective units similar to those of the monitoring control server software 801 of Embodiment 3.

The travel mode storing unit 3301 receives the travel mode of the autonomous vehicle 101 transmitted by the autonomous vehicle 101 via the communication device 701 and stores the travel mode therein. The travel mode-base emergency control table 3302 is a table that records the travel mode of the autonomous vehicle 101 and the emergency control method in correlation. The emergency control execution determining unit 3303 refers to the key frame loss rate and difference frame loss rate combination determination table 2604, acquires the present travel mode from the travel mode storing unit 3301 when the key frame loss rate and the difference frame loss rate satisfy any one of the determination conditions in the key frame loss rate and difference frame loss rate combination determination table 2604, determines the emergency control method corresponding to the present travel mode by referring to the travel mode-base emergency control table 3302, and notifies the emergency control signal transmitting unit 808 of the emergency control method.

Figure 34:
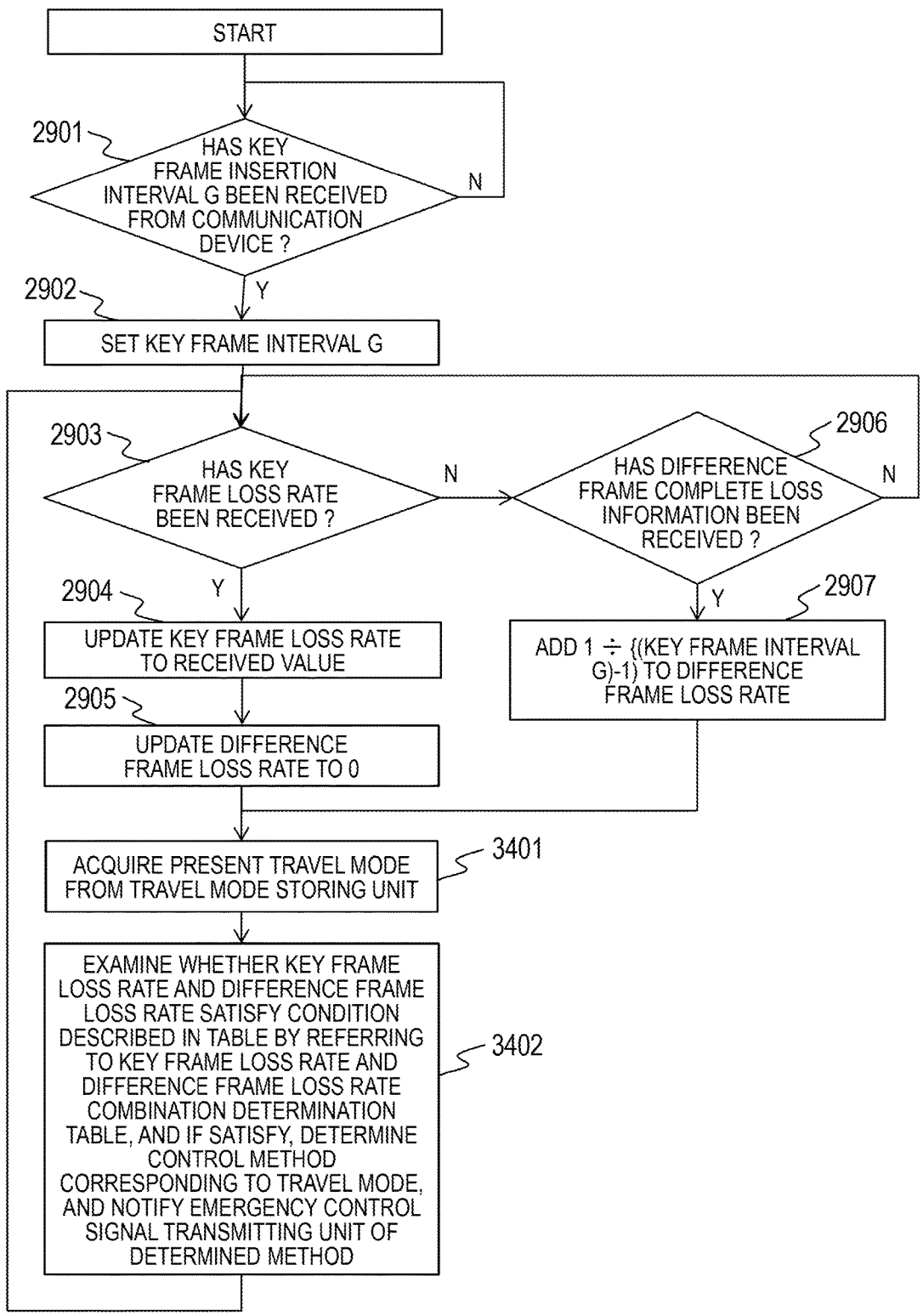
FIG. 34 is a flowchart illustrating the process of an emergency control execution determining unit according to Embodiment 6 of the present invention.

FIG. 34 is a flowchart illustrating the process of the emergency control execution determining unit 3303 according to Embodiment 6 of the present invention.

In FIG. 34, the same processes as the processes of the emergency control determining unit of Embodiment 5 will be denoted by the same reference numerals and the description thereof will be omitted. The emergency control execution determining unit 3303 of the present embodiment executes step 3401 when step 2905 or 2907 is executed. In step 3401, the emergency control execution determining unit 3303 acquires the present travel mode from the travel mode storing unit 3301 and the flow proceeds to step 3402. In step 3402, the emergency control execution determining unit 3303 refers to the key frame loss rate and difference frame loss rate combination determination table 2604, examines whether the computed key frame loss rate and the difference frame loss rate satisfy the condition described in the table, determines an emergency control method corresponding to the travel mode when the condition is satisfied, and notifies the emergency control signal transmitting unit 808 of the emergency control method.

FIG. 35 is an explanatory diagram illustrating an example of the travel mode-base emergency control table 3302 according to Embodiment 6 of the present invention.

The travel mode-base emergency control table 3302 includes a travel mode 3501 and an emergency control method 3502. In step 3402 in FIG. 34, the emergency control execution determining unit 2603 refers to the key frame loss rate and difference frame loss rate combination determination table 2604, acquires the travel mode when the key frame loss rate and the difference frame loss rate satisfy the condition described in the table, and determines that speed limiter control (restriction of travel speed to 5 km/h or lower) (field 3505) is to be executed as the emergency control method 3502 when the travel mode 3501 is automated driving (field 3503). When the travel mode 3501 is remote-controlled driving (field 3504), it is determined that emergency stop (field 3506) is to be executed as the emergency control method 3502.

According to the present embodiment, in a system in which a vehicle moving by autonomous driving and a center are connected via a communication network and remote monitoring and control is performed, since minimally necessary emergency control corresponding to the key frame loss rate, the difference frame loss rate, and the travel mode of the autonomous vehicle is executed, it is possible to further shorten the moving time while securing the vehicle safety.

As described above, the monitoring control server 105 according to Embodiments 1 to 6 of the present invention estimates the quality of the image generated by the decoding unit 805 from the received image data and output by the display device 707 on the basis of a resources state of the image data received from the autonomous vehicle 101 rather than the communication quality between the autonomous vehicle 101 and the monitoring control server 105. The monitoring control server 105 transmits an emergency control signal when it is determined that the estimated quality of the image does not satisfy a requirement required for safe remote-controlled driving.

Specifically, the monitoring control server 105 may determine whether the image quality satisfies a desired requirement on the basis of the key frame loss rate only or both the key frame loss rate and the difference frame loss rate. In Embodiments 1 and 4, it is determined whether the image quality satisfies a desired requirement on the basis of the key frame loss rate only. Particularly, in Embodiments 2 and 4, the degree of image quality is estimated on the basis of the key frame loss rate only, and emergency control corresponding thereto is executed. In Embodiments 5 and 6, it is determined whether the image quality satisfies a desired requirement on the basis of both the key frame loss rate and the difference frame loss rate.

In this way, since emergency control is not executed when the image quality does not satisfy a desired requirement even if the communication quality is low (or minimal control is executed such as a decrease in the restricted travel speed is small even when the control executed), it is possible to shorten the moving time while securing the safety of the vehicle.

This invention is not limited to the embodiments described above, and encompasses various modification examples. For example, the embodiments have been described in detail for easier understanding of this invention, and this invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The components, functions, processing modules, processing measures, and the like described above may be implemented partially or entirely by hardware by, for example, designing the components and the like as an integrated circuit. The components, functions, and the like described above may also be implemented by software by interpreting and executing, with a processor, programs that implement the respective functions. The programs, tables, files, and other types of information for implementing the functions can be stored in a computer-readable non-transitory data storage medium such as a non-volatile semiconductor memory, or a hard disk drive, a solid state drive (SSD), or other storage device, or an IC card, an SD card, a DVD, or the like.

Further, the control lines and information lines considered to be required for the description are illustrated. It is not necessarily the case that all the control lines and information lines required for a product are illustrated. In actual practice, almost all the configurations may be considered as being connected to each other.

What is claimed is:

1. A monitoring control system comprising a mobile object and a server device that communicates with the mobile object via a network, wherein
the mobile object includes:
a first communication unit that communicates with the server device via the network;
a camera that captures an image;
an encoding unit that generates image data from the image captured by the camera, the image data including a key frame inserted at a predetermined interval and a difference frame including a difference from the key frame;
a transmitting unit that transmits the image data generated by the encoding unit to the server device via the first communication unit; and
a movement control unit that controls movement of the mobile object according to a control signal received from the server device via the first communication unit, and
the server device includes:
a second communication unit that communicates with the mobile object via the network; and
an emergency control signal transmitting unit that transmits an emergency control signal to the mobile object via the second communication unit when at least a part of the key frame among the image data transmitted from the mobile object is not received within a predetermined period.

2. The monitoring control system according to claim 1, wherein
the emergency control signal is a signal for instructing emergency control based on either restriction of a moving speed of the mobile object or emergency stop of the mobile object.

3. The monitoring control system according to claim 2, wherein
the server device stores emergency control information that correlates a loss rate of the key frame and an emergency control method such that the higher the loss rate of the key frame, the lower the moving speed of the mobile object is restricted to,
the server device includes:
a key frame loss rate computing unit that computes the loss rate of the key frame on the basis of whether at least a part of the key frame is received within the predetermined period; and
an emergency control determining unit that determines an emergency control method corresponding to the computed key frame loss rate on the basis of the emergency control information, and
the emergency control signal transmitting unit transmits the emergency control signal for executing the emergency control method determined by the emergency control determining unit.

4. The monitoring control system according to claim 2, wherein
the movement control unit executes control according to any one of movement modes including automated driving and remote-controlled driving based on a control signal received from the server device in order to control the movement of the mobile object,
the server device stores emergency control information that correlates the movement mode and the emergency control method with each other such that the moving speed of the mobile object during the remote-controlled driving is restricted to be lower than that during the automated driving, and stores the movement mode of the control being executed in the mobile object,
the server device includes an emergency control determining unit that determines an emergency control method corresponding to the stored movement mode on the basis of the emergency control information, and
the emergency control signal transmitting unit transmits the emergency control signal for executing the emergency control method determined by the emergency control determining unit.

5. The monitoring control system according to claim 2, wherein
the movement control unit executes control according to any one of movement modes including automated driving and remote-controlled driving based on a control signal received from the server device in order to control the movement of the mobile object,
the server device stores emergency control information that correlates the movement mode, the key frame loss rate, and the emergency control method with each other such that the moving speed of the mobile object during the remote-controlled driving is restricted to be lower than that during the automated driving, and the higher the key frame loss rate, the lower the moving speed of the mobile object is restricted to, and stores the movement mode of the control being executed in the mobile object,
the server device includes:
a key frame loss rate computing unit that computes a loss rate of the key frame on the basis of whether at least a part of the key frame is received within the predetermined period; and
an emergency control determining unit that determines an emergency control method corresponding to the stored movement mode and the computed key frame loss rate on the basis of the emergency control information, and
the emergency control signal transmitting unit transmits the emergency control signal for executing the emergency control method determined by the emergency control determining unit.

6. The monitoring control system according to claim 2, wherein
the server device stores a threshold of the difference frame loss rate set such that the higher the key frame loss rate, the lower the threshold,
the server device includes:
a key frame loss rate computing unit that computes the loss rate of the key frame on the basis of whether at least a part of the key frame is received within the predetermined period;
a difference frame loss rate computing unit that computes the difference frame loss rate on the basis of whether at least a part of the difference frame is received within a predetermined period; and an emergency control determining unit that determines that emergency control is to be executed when the computed difference frame loss rate is equal to or larger than the threshold corresponding to the computed key frame loss rate, and the emergency control signal transmitting unit transmits the emergency control signal when the emergency control determining unit determines that the emergency control is to be executed.

7. The monitoring control system according to claim 2, wherein the movement control unit executes control according to any one of movement modes including automated driving and remote-controlled driving based on a control signal received from the server device in order to control the movement of the mobile object, the server device stores emergency control information that correlates the movement mode and the emergency control method with each other such that the moving speed of the mobile object during the remote-controlled driving is restricted to be lower than that during the automated driving, and stores a threshold of the difference frame loss rate set such that the higher the key frame loss rate, the lower the threshold, the server device includes:

a key frame loss rate computing unit that computes the key frame loss rate on the basis of whether at least a part of the key frame is received within a predetermined period;

a difference frame loss rate computing unit that computes the difference frame loss rate on the basis of whether at least a part of the difference frame is received within a predetermined period; and an emergency control determining unit that determines an emergency control method corresponding to the stored movement mode on the basis of the emergency control information when the computed difference frame loss rate is equal to or larger than the threshold corresponding to the computed key frame loss rate, and the emergency control signal transmitting unit transmits the emergency control signal for executing the emergency control method determined by the emergency control determining unit.

8. A monitoring control device comprising a communication unit that communicates with a mobile object and an emergency control signal transmitting unit that transmits an emergency control signal via the communication unit, wherein the communication unit receives image data transmitted from the mobile object, the image data including a key frame inserted at a predetermined interval and a difference frame including a difference from the key frame, and the emergency control signal transmitting unit transmits an emergency control signal to the mobile object via the communication unit when at least a part of the key frame among the image data transmitted from the mobile object is not received within a predetermined period.

9. The monitoring control device according to claim 8, wherein the emergency control signal is a signal for instructing emergency control based on either restriction of a moving speed of the mobile object or emergency stop of the mobile object.

10. The monitoring control device according to claim 9, wherein the monitoring control device stores emergency control information that correlates a loss rate of the key frame and an emergency control method such that the higher the loss rate of the key frame, the lower the moving speed of the mobile object is restricted to, the monitoring control device includes:

a key frame loss rate computing unit that computes the loss rate of the key frame on the basis of whether at least a part of the key frame is received within the predetermined period; and an emergency control determining unit that determines an emergency control method corresponding to the computed key frame loss rate on the basis of the emergency control information, and the emergency control signal transmitting unit transmits the emergency control signal for executing the emergency control method determined by the emergency control determining unit.

11. The monitoring control device according to claim 9, wherein the mobile object executes control according to any one of movement modes including automated driving and remote-controlled driving based on a control signal received from the server device, the monitoring control device stores emergency control information that correlates the movement mode and the emergency control method with each other such that the moving speed of the mobile object during the remote-controlled driving is restricted to be lower than that during the automated driving, and stores the movement mode of the control being executed in the mobile object, the monitoring control device includes an emergency control determining unit that determines an emergency control method corresponding to the stored movement mode on the basis of the emergency control information, and the emergency control signal transmitting unit transmits the emergency control signal for executing the emergency control method determined by the emergency control determining unit.

12. The monitoring control device according to claim 9, wherein the mobile object executes control according to any one of movement modes including automated driving and remote-controlled driving based on a control signal received from the server device, the monitoring control device stores emergency control information that correlates the movement mode, the key frame loss rate, and the emergency control method with each other such that the moving speed of the mobile object during the remote-controlled driving is restricted to be lower than that during the automated driving and the higher the key frame loss rate, the lower the moving speed of the mobile object is restricted to, and stores the movement mode of the control being executed in the mobile object, the monitoring control device includes:

a key frame loss rate computing unit that computes a loss rate of the key frame on the basis of whether at least a part of the key frame is received within the predetermined period; and an emergency control determining unit that determines an emergency control method corresponding to the stored movement mode and the computed key frame loss rate on the basis of the emergency control information, and the emergency control signal transmitting unit transmits the emergency control signal for executing the emergency control method determined by the emergency control determining unit.

13. The monitoring control device according to claim 9, wherein
the monitoring control device stores a threshold of the difference frame loss rate set such that the higher the key frame loss rate, the lower the threshold,
the monitoring control device includes:
a key frame loss rate computing unit that computes the loss rate of the key frame on the basis of whether at least a part of the key frame is received within the predetermined period;
a difference frame loss rate computing unit that computes the difference frame loss rate on the basis of whether at least a part of the difference frame is received within a predetermined period; and
an emergency control determining unit that determines that emergency control is to be executed when the computed difference frame loss rate is equal to or larger than the threshold corresponding to the computed key frame loss rate, and
the emergency control signal transmitting unit transmits the emergency control signal when the emergency control determining unit determines that the emergency control is to be executed.

14. The monitoring control device according to claim 9, wherein
the mobile object executes control according to any one of movement modes including automated driving and remote-controlled driving based on a control signal received from the server device,
the monitoring control device stores emergency control information that correlates the movement mode and the emergency control method with each other such that the moving speed of the mobile object during the remote-controlled driving is restricted to be lower than that during the automated driving, and stores a threshold of the difference frame loss rate set such that the higher the key frame loss rate, the lower the threshold,
the monitoring control device includes:
a key frame loss rate computing unit that computes the key frame loss rate on the basis of whether at least a part of the key frame is received within a predetermined period;
a difference frame loss rate computing unit that computes the difference frame loss rate on the basis of whether at least a part of the difference frame is received within a predetermined period; and
an emergency control determining unit that determines an emergency control method corresponding to the stored movement mode on the basis of the emergency control information when the computed difference frame loss rate is equal to or larger than the threshold corresponding to the computed key frame loss rate, and
the emergency control signal transmitting unit transmits the emergency control signal for executing the emergency control method determined by the emergency control determining unit.

15. A monitoring control method executed by a monitoring control system including a mobile object and a server device that communicates with the mobile object via a network, wherein
the mobile object includes:
a first communication unit that communicates with the server device via the network;
a camera that captures an image;
a movement control unit that controls movement of the mobile object; and
a first information processing unit connected to the camera and the movement control unit,
the server device includes:
a second communication unit that communicates with the mobile object via the network; and
a second information processing unit connected to the second communication unit, and
the monitoring control method comprises:
a first procedure of causing the first information processing unit to generate image data from the image captured by the camera, the image data including a key frame inserted at a predetermined interval and a difference frame including a difference from the key frame;
a second procedure of causing the first information processing unit to transmit the image data to the server device via the first communication unit; and
a third procedure of causing the second information processing unit to transmit an emergency control signal to the mobile object via the second communication unit when at least a part of the key frame among the image data transmitted from the mobile object is not received within a predetermined period.

* * * * *